US008522019B2

(12) United States Patent
Michaelis

(10) Patent No.: US 8,522,019 B2
(45) Date of Patent: Aug. 27, 2013

(54) METHOD AND APPARATUS TO CREATE TRUST DOMAINS BASED ON PROXIMITY

(75) Inventor: Oliver Michaelis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1587 days.

(21) Appl. No.: 12/035,309

(22) Filed: Feb. 21, 2008

(65) Prior Publication Data

US 2008/0222711 A1 Sep. 11, 2008

Related U.S. Application Data

(60) Provisional application No. 60/891,230, filed on Feb. 23, 2007.

(51) Int. Cl.
*H04L 9/32* (2006.01)
*G06F 7/04* (2006.01)
*G06F 17/30* (2006.01)
*H04B 7/00* (2006.01)
*H04W 4/00* (2009.01)

(52) U.S. Cl.
USPC ............ 713/168; 713/170; 726/2; 726/3; 726/4; 370/310; 370/328

(58) Field of Classification Search
USPC ............ 726/2, 3, 5, 6, 7; 709/227, 228; 713/168–172; 370/328–338; 455/422.1, 455/432.1–435.3
See application file for complete search history.

(56) References Cited

U.S. PATENT DOCUMENTS

| 5,887,063 | A | 3/1999 | Varadharajan et al. |
|---|---|---|---|
| 6,772,331 | B1 * | 8/2004 | Hind et al. .............. 713/151 |
| 7,027,773 | B1 * | 4/2006 | McMillin .............. 455/41.2 |
| 7,136,999 | B1 * | 11/2006 | Griffiths ................ 713/168 |
| 7,350,230 | B2 * | 3/2008 | Forrest ................... 726/9 |
| 7,597,250 | B2 * | 10/2009 | Finn ..................... 235/380 |

(Continued)

FOREIGN PATENT DOCUMENTS

| CN | 1404672 A | 3/2003 |
|---|---|---|
| FR | 2886753 | 12/2006 |

(Continued)

OTHER PUBLICATIONS

International Search Report, PCT/US08/054900, International Search Authority, European Patent Office, Jul. 28, 2008.

(Continued)

*Primary Examiner* — Tae Kim
(74) *Attorney, Agent, or Firm* — James T. Hagler

(57) ABSTRACT

Devices and methods use close range communication links, e.g., near field communication (NFC) links, to authenticate communication devices to one another to create or join a new device to a trust domain. Once two devices establish a close range communication peer-to-peer link the devices exchange credential information that provide an infrastructure for the trust domain. Medium or long range wireless or wired network communication links can then be used for secure and trusted communications. Proximity limits of the close range communication P2P link enables mutual trust to be presumed among devices, providing added security to the process of extending a trust domain and reducing the need for security and authentication signaling. Embodiments provide a variety of methods for extending credential infrastructure among devices. Embodiments further enable simple to use virtual cables that can provide secure point-to-point communications that are configured merely by touching two communication devices together.

14 Claims, 20 Drawing Sheets

(56) References Cited

U.S. PATENT DOCUMENTS

| | | | |
|---|---|---|---|
| 7,653,037 B2* | 1/2010 | Prakash et al. | 370/338 |
| 7,797,535 B2* | 9/2010 | Sakai | 713/168 |
| 7,925,022 B2* | 4/2011 | Jung et al. | 380/270 |
| 8,056,117 B2* | 11/2011 | Jung et al. | 726/2 |
| 8,281,144 B2* | 10/2012 | Huh et al. | 713/182 |
| 2001/0007815 A1* | 7/2001 | Philipsson | 455/41 |
| 2003/0149874 A1* | 8/2003 | Balfanz et al. | 713/168 |
| 2004/0161111 A1 | 8/2004 | Sherman | |
| 2004/0235568 A1* | 11/2004 | Kim | 463/42 |
| 2005/0109841 A1* | 5/2005 | Ryan et al. | 235/380 |
| 2005/0215233 A1* | 9/2005 | Perera et al. | 455/411 |
| 2005/0239438 A1* | 10/2005 | Naghian | 455/410 |
| 2005/0287950 A1* | 12/2005 | Helden et al. | 455/41.2 |
| 2006/0085844 A1* | 4/2006 | Buer et al. | 726/4 |
| 2006/0105712 A1* | 5/2006 | Glass et al. | 455/41.2 |
| 2006/0174116 A1* | 8/2006 | Balfanz et al. | 713/168 |
| 2006/0178131 A1* | 8/2006 | Huotari et al. | 455/410 |
| 2006/0219776 A1* | 10/2006 | Finn | 235/380 |
| 2006/0234631 A1* | 10/2006 | Dieguez | 455/41.2 |
| 2006/0251256 A1* | 11/2006 | Asokan et al. | 380/270 |
| 2006/0253894 A1* | 11/2006 | Bookman et al. | 726/2 |
| 2006/0258289 A1* | 11/2006 | Dua | 455/41.3 |
| 2007/0178882 A1* | 8/2007 | Teunissen et al. | 455/411 |
| 2007/0194945 A1* | 8/2007 | Atkinson | 340/825.72 |
| 2007/0197261 A1* | 8/2007 | Humbel | 455/558 |
| 2007/0204149 A1* | 8/2007 | Balfanz et al. | 713/156 |
| 2007/0274241 A1* | 11/2007 | Brothers | 370/310 |
| 2007/0277230 A1* | 11/2007 | Hawkins et al. | 726/4 |
| 2008/0172340 A1* | 7/2008 | Karlsson | 705/75 |
| 2008/0219227 A1* | 9/2008 | Michaelis | 370/338 |
| 2008/0220878 A1* | 9/2008 | Michaelis | 463/42 |
| 2009/0049556 A1* | 2/2009 | Vrielink et al. | 726/26 |
| 2009/0144815 A1* | 6/2009 | Vrielink et al. | 726/7 |
| 2009/0265775 A1* | 10/2009 | Wisely et al. | 726/9 |

FOREIGN PATENT DOCUMENTS

| | | | |
|---|---|---|---|
| JP | 9167098 A | | 6/1997 |
| JP | 2004501459 A | | 1/2004 |
| JP | 2004118488 A | | 4/2004 |
| JP | 2004254320 A | | 9/2004 |
| KR | 20020040779 | | 5/2002 |
| WO | WO 01/99369 | * | 6/2000 |
| WO | WO0145319 | | 6/2001 |
| WO | 0173575 | | 10/2001 |
| WO | 0199369 | | 12/2001 |
| WO | 2004109992 | | 12/2004 |

OTHER PUBLICATIONS

Written Opinion, PCT/US08/054900, International Search Authority, European Patent Office, Jul. 28, 2008.

* cited by examiner

METHOD AND APPARATUS TO CREATE TRUST DOMAINS BASED ON PROXIMITY

RELATED APPLICATIONS

The present application claims the benefit of priority to U.S. Provisional Patent Application No. 60/891,230 filed Feb. 23, 2008 entitled "Method and Apparatus to Deploy Dynamic Credential Infrastructure Based on Proximity," the entire contents of which are hereby incorporated by reference.

FIELD OF THE INVENTION

The present invention relates generally to computer network communications, and more specifically to methods for deploying dynamic credential infrastructure based on proximity.

BACKGROUND

As the amount of commerce continues to increase over networks, such as the Internet, security becomes a much larger issue. Unfortunately, the protocols underlying the Internet, such as TCP/IP (Transmission Control Protocol/ Internet Protocol), were not designed to provide secure data transmission. The Internet was originally designed with the academic and scientific communities in mind, and it was assumed that the users of the network would be working in non-adversarial, cooperative manners. As the Internet began to expand into a public network, usage outside these communities was relatively limited, with most of the new users located in large corporations. These corporations had the computing facilities to protect their user's data with various security procedures, such as firewalls, that did not require security to be built into the Internet itself. In the past several years, however, Internet usage has skyrocketed. Millions of people now use the Internet and the Web on a regular basis. (Hereinafter, the terms "Internet" and "Web" are used synonymously unless otherwise indicated.) These users perform a wide variety of tasks, from exchanging electronic mail messages to searching for information to performing business transactions. These users may be accessing the Internet from home, from their cellular phone, or from a number of other environments where security procedures are not commonly available.

To support the growth of business on the Internet, often referred to as "electronic commerce" or simply "e-commerce," easily-accessible and inexpensive security procedures had to be developed. A first commonly used security measure involves a Public Key Infrastructure (hereinafter "PKI"). PKI utilizes certificates as a basis for a security infrastructure. Certificates utilize public keys and third party verification entities to allow servers to decode client transmissions and authenticate the client's identity. In operation, a first node in a network can encrypt a message with its own private key. The message can be read by a second node with the first node's public key. A public key can only be used to decrypt messages created by the private key and cannot be used to encrypt messages. Thus, the first node is free to distribute their public key. One way in which public keys are distributed is by including them in certificates. There are a number of standards for certificates including the X0.509 standard, which defines a standard format for certificates. X0.509 is an ITU Recommendation and International Standard that defines a framework for providing authentication. (See "ITU Recommendation X0.509 (1997) Information Technology—Open Systems Interconnection—The Directory: "Authentication Framework", dated November 1993. This information is also published in International Standard ISDO/IEC 9594-8 (1995).) A certificate format is defined in this standard. Certificates created according to this international standard, in the defined format, are referred to as "X0.509 certificates."

SUMMARY

In the various embodiments, methods, systems and devices are provided for deploying dynamic credential infrastructure based on proximity. The embodiments include establishing a close range or near field communications link and sending credentialed information across that communications link. The identity of a user may be verified using another separate credential, such as a password or biometric data. A variety of wireless proximity-limited communication technologies may be used for mobile devices (e.g., cell phones, PDAs, and other wireless devices) to establish a peer-to-peer (P2P) data link. After the P2P link has been configured with wireless proximity-limited communication, security credential information can be communicated via that link that can be used to secure or authenticate another wireless communication technology, such as BlueTooth® or Wi-Fi, that can be used for longer-range communication or for transferring larger amounts of data. Since wireless proximity-limited communication technologies are limited to short ranges, this self establishing wireless communication link provides an intuitive mechanism for users to authenticate mobile devices prior to or during transfer of credential information by bringing two or more mobile devices into close proximity.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
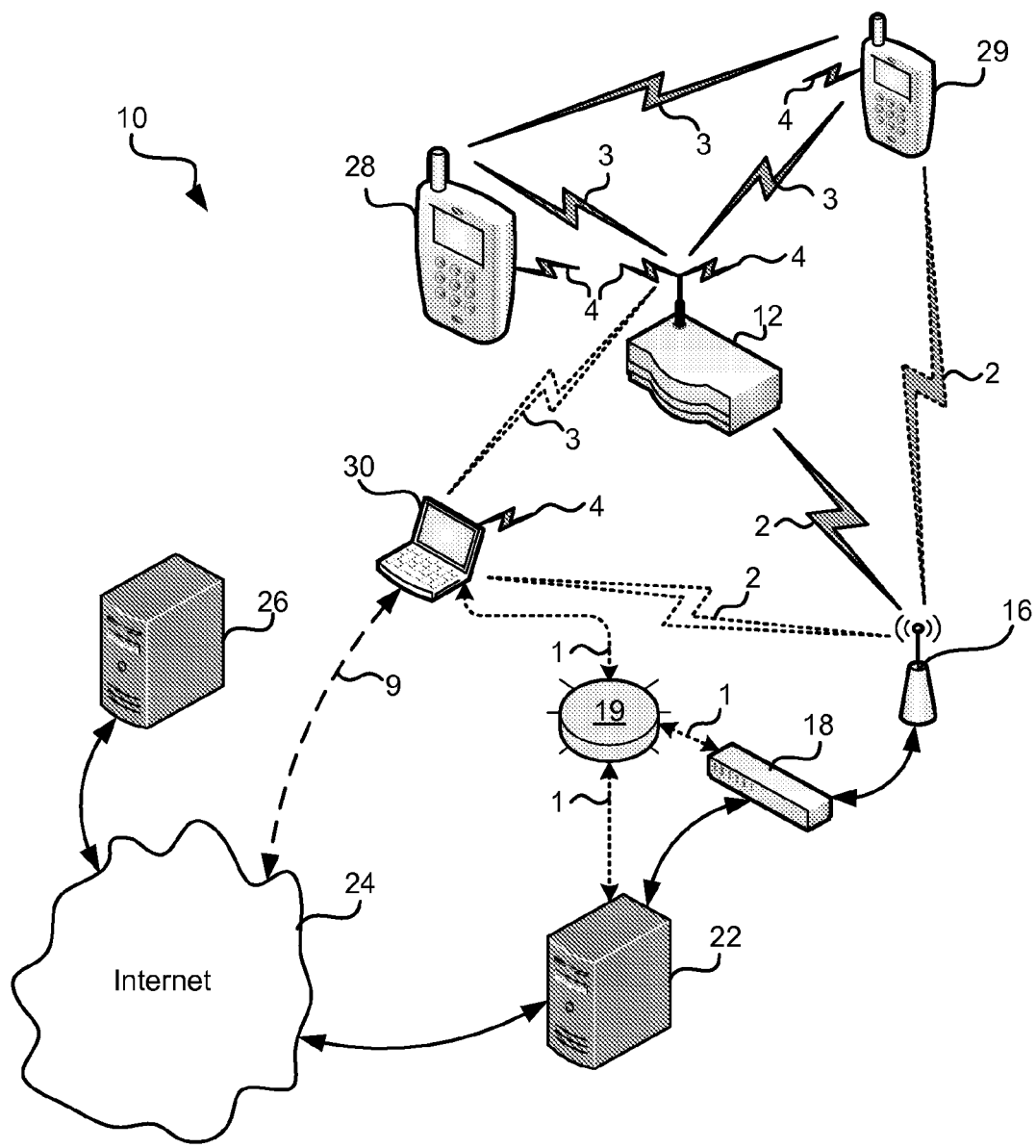
FIG. 1 is a system block diagram of wireless cellular network which includes short-range wireless communication implemented on a number of mobile devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor and memory, a close range communication transceiver and another communication transceiver capable of connecting to a wireless network. As used herein, the terms "device," "communication device," "wireless device," and "wireless communications device," are used interchangeably to refer to electronic devices which include a close range communication transceiver, a second transceiver (which may be wired or wireless) and a processor coupled to the two transceivers which is configured with software instructions to participate in the embodiment systems and perform some steps of the embodiment methods. Some examples of suitable devices are described in more detail below with reference to FIGS. 1, 15-17 and 20, but the terms are intended to be interpreted broadly as the embodiments are applicable to a broad range of applications and implementations beyond those of the example embodiments. Some embodiments refer to cellular telephone network systems including cell towers of such networks, the scope of the present invention and the claims encompass any wired or wireless communication system, including for example, Ethernet, WiFi, WiMax, and other wireless data network communication technologies.

As used herein, the term "trust domain" refers to a set of devices in possession of common or related credentials such that the devices can "trust" each other to share confidential information and exchange communications in a secure manner. An example of a trust domain is a pair (or more) of devices sharing a set of X0.509 certificates signed by the same Certificate Authority (CA), i.e. a PKI. Another example of a trust domain is a pair (or more) of devices sharing symmetric credentials. To extend a trust domain to another device, the receiving device needs to be verified as a valid new member, and the credentials need to be exchanged securely.

The various embodiments make use of wireless proximity-limited communication technologies to impose the need to bring two electronic devices to authenticate and then exchange credential information such as digital certificates, encryption keys, and other credential data as may be used to deploy credential infrastructure (such as PKIs) for secure wired or wireless communication between two or more devices. A variety of wireless proximity-limited communication technologies may be used for this purpose. For example, near-field communications (NFC) protocol technologies may be used. NFC technology devices operate in the unregulated RF band of 13.56 MHz and fully comply with existing contactless smart-card technologies, standards, and protocols such as FeliCa and Mifare. NFC-enabled devices are interoperable with contactless smart-cards and smart-card readers conforming to these protocols. The effective range of NFC protocol communications is approximately 0-20 cm (up to 8 in.) and data communications terminates either by a command from an application using the link or when the communicating devices move out of range.

Evolving from a combination of contactless, identification and networking technologies, the NFC protocols are short-range wireless connectivity standards. A number of international standards have been established for NFC protocols, including for example: ISO/IEC 14443; ISO/IEC 15693; ISO/IEC 18092; ISO/IEC 21481; ISO/IEC 22536; ISO/IEC 23917; ISO/IEC DIS 28361; ECMA-340, referred to as NFCIP-1; ECMA-352, referred to as NFCIP-2; ECMA-356; ECMA-362; ECMA-373; ECMA/TC32-TG19/2006/057; NFC-WI; and NFC-FEC.

However, the embodiments and the claims are not necessarily limited to any one or all of the NFC protocols, and instead may encompass any close range (i.e., proximity-limited) wireless communication link. Any wireless proximity-limited communication technology may be used in some of the embodiments. In addition to the NFC protocols listed above, wireless proximity-limited communication links may be established using other close range communication media, including for example radiofrequency identification (RFID) tags and the IrDA (Infrared Data Association) protocol. Also, other close range wireless protocols and standards may be developed and may be used in the various embodiments in the same manner as NFC protocol devices. Further, longer range wireless technologies and protocols may be used with modifications or additions that limit their effective range for purposes of identifying electronic devices one to another. For example, WiFi, BlueTooth® (which communicates using the 2.4 GHz frequency band), UWB (Ultra Wideband), IEEE 802.15.4, and Zigbee® wireless communication protocols and standards may also be used in combination with range-limiting features. For example, the power of transmitters may be limited for authentication communications, such that two devices must be relatively close together (e.g., within a few feet of each other) in order to send and receive the communications. As another example, round-trip communication delay limits may be imposed such that authentication communications can only occur if the round trip of such signals is less than a threshold set to reject signals sent from more than a dozen feet or so, which may be as short as two to three feet separation.

With the increased adoption of radio frequency identification (RFID) contactless smart-cards support a broad range of applications, such as access, payment, and ticketing, and the commercial availability of NFC protocol devices such as cell phones, the convergence of mobile devices with RFID is gaining interest.

For simplicity of reference, the various embodiments and the claims refer to "close range communications" and "near field communications" in order to encompass any and all wireless proximity-limited communication technologies. References herein to "close range communication links" (CRCL) and "near field communications" are not intended to limit the scope of the description or the claims in any way other than the communications technology will not exchange credential information beyond about three meters (about twelve feet). In a preferred embodiment, the communication range is limited to less than about one meter (about three feet), in a further preferred embodiment, the communication range is limited to less than about one foot, and in some embodiments the communication range is limited to approximately 0-20 cm (up to 8 in.). In order to reflect this distinction, descriptions of embodiments using links with communication ranges of approximately 0-20 cm (up to 8 in.) are refer to "NFC protocol" links. Therefore, references to "near field communication protocol" and "NFC protocol" communications are intended to be limited to communications transceivers and technologies with ranges provided by the various NFC protocols and standards listed above, but may also include RFID transceivers and technologies with a similarly limited communication range.

With close range communications like NFC protocol devices it is possible to connect any two devices to each other to exchange information or access content and services—easily and securely. Solution vendors argue that the intuitive operation of NFC protocol systems makes the technology particularly easy for consumers to use ("just touch and go"), while the inherent security resulting from its very short communication range makes such systems ideal for mobile payment and financial transaction applications. Familiar applications of NFC protocol technology are electronic pass keys used in building security systems, mass transit fare card systems, and smart credit cards which need only to be brought close to a point of sale reader to complete a transaction.

As mobile devices and consumer electronic devices become more capable and many services can be provisioned post-sale, scalable methods of deploying credentialed infrastructure (such as PKIs) and similar credential post-production are becoming increasingly important. The exchange of credential information can be handled using a variety of proven methods, which can involve complex protections to prevent eavesdropping, counterfeiting and misappropriation. However, there are times when two devices can be placed in close proximity to allow users to be inherently trusted (i.e. correct device behavior is in the user's interest), or the proximity condition is established in a trusted environment (e.g. at a teller station in a bank), or additional credentials are used to allow the extension of a trust domain to a new device. Thus, the various embodiments provide simpler systems and methods to extend a trust domain of an existing credentialed infrastructure by leveraging the inherent security afforded by proximity.

In overview, the various embodiments leverage close range communications to exchange credential information in order to ensure physical awareness prior to creating or extending a trust domain. The use of close range near-field communication technology establishes physical awareness between a device already in a trust domain and a new device to be added, as the devices need to be in close contact (e.g., within about 8 inches with NFC protocol devices). Upon such a proximity event, a device within the trust domain uses a wireless protocol to send credential information to the new device. While close range communications and NFC protocol links allows credentials to be exchanged in the clear with minimal risk of interception or interference, integrity-protected, and/or confidentiality-protected communications may also be used depending on the implementation. NFC protocol technologies are limited to such short ranges that users must touch or nearly touch two devices together to establish the communication link. This physical action, referred to herein as a proximity event, thus provides an intuitive mechanism for establishing a peer-to-peer (P2P) wireless communication link; if users want to join a new device to a trust domain, they merely touch the new device to a member of the trust domain. In the various embodiments, this touch-to-communicate mechanism is leveraged to provide an intuitive means for users to authenticate mobile devices to one another prior to or while exchanging credential data. Once the two (or more) devices establish a closer range P2P link and exchange credential data, longer range wireless (or wired) network secured and trusted communications can be established using the credential infrastructure. In addition to adding a layer of security, the various methods obviate the need for involved security and authentication protocols to form or add members to a trust group. The limited range of close range P2P links makes them generally invulnerable to eavesdropping and avoids issues of unwanted devices attempting to hack into trusted communications via long range wireless links.

As part of or in addition to exchanging credential information, the short-range communication link may also be used to exchange information required to establish the second wired or wireless communication link that is used by the trust domain. For example, the two devices may exchange address and device identifier information necessary to enable immediately establishing a BlueTooth® wireless data link with no further synchronization activity or user action. As another example, the two devices may exchange Internet protocol (IP) or local area network address information to enable communication via WiFi wireless or Ethernet-based networks. In this manner, the proximity event ensures that the two devices are able to communicate securely without requiring any further user action. Thus, the various embodiments enable users to initiate secure trust domain communications merely by bringing two or more devices into close proximity.

In an embodiment, a trust domain may utilize a proximity event and the associated close range communication link to accept a new member as a valid device to extend the trust domain to the new member. This may entail user notification. Alternatively, the trust domain may utilize the proximity detection method in conjunction with user confirmation to accept a new member as a valid device to extend the trust domain to new member. This embodiment is explained in more detail below with reference to FIGS. 2-3.

In another embodiment, a trust domain utilizes a proximity event and the associated close range communication link plus another separate credential to accept a new member as a valid device to extend the trust domain to the new member. This embodiment may entail passwords, biometric measurements, and other externally provided credentials. This embodiment is explained in more detail below with reference to FIGS. 4-5.

In another embodiment, a trust domain utilizes a proximity event and the associated close range communication link plus another credential already established on a new device, e.g. a provisioning PKI of the device manufacturer or service provider to verify the origin of the new member, while the proximity condition is used to further authenticate the new device and communicate credentials for a new service. This embodiment is explained in more detail below with reference to FIGS. 6-8.

In another embodiment, a trust domain utilizes a proximity event and the associated close range communication link of two subsequent devices (such as within a certain time limit) to accept a new member as a valid device and to extend the trust domain to the new member. The first device contact establishes a physically secure environment (e.g. a bank's customer service desk), while the second device contact (i.e., proximity event) establishes a credential to use to establish the trust domain. This embodiment may be useful when the provisioning entity is trusted by a service entity via other non-electronic/non-cryptographic means, e.g. contractually, via ownership, etc. This embodiment is explained in more detail below with reference to FIGS. 9-10.

In the various embodiments, the set of credentials within the trust domain may be pre-existing when the new member is discovered in a proximity condition. In such circumstances, the trust domain may extend the existing set of credentials to the new device. Alternatively, a member of the trust domain may generate a new set of credentials triggered by the discovery of the new member in a proximity condition. This alternative is explained in more detail below with reference to FIGS. 11-12.

In the various embodiments, a proximity event may also be used as part of removing a device from a trust domain. This embodiment is explained in more detail below with reference to FIGS. 13-14.

The various embodiments may be employed in a variety of wired and wireless networks, including for example a wireless network employing cellular data communication links. By way of example, FIG. 1 shows a block diagram of a trust domain communication network 10 including a cellular network in which some mobile cellular devices have the additional ability to function as readers of close-range wireless communications, such as NFC protocol and RFID communications. The network 10 may include a terminal 12, which in the illustrated system is configured with a network antenna and transceiver for transmitting and receiving cellular signals 2 from/to a cellular base site or base station (BS) 16. The terminal 12 also includes a close range communications transceiver. In this example network 10, the base station 16 is a part of a cellular network that includes elements required to operate the network, such as a mobile switching center (MSC) 18. In operation, the MSC 18 is capable of routing calls and messages to and from the terminal 12 via the base station 16 when the terminal 12 is making and receiving cellular data calls. The MSC 18 also provides a connection to telephone landline trunks (not shown) when the terminal 12 is involved in a call. Further, the MSC can, but need not, be coupled to a server gateway 22 coupled to the Internet 24.

The MSC 18 can also be coupled to a network 19 by a wired network connection 1, such as a local area network (LAN), a metropolitan area network (MAN), and/or a wide area network (WAN). The MSC 18 can be coupled to the network 19 directly by a wired network connection 1, or if the system includes a gateway 22 (as shown), the MSC can be coupled to the network 19 via the gateway 22 which has a wired network connection 1 to the network 19. In a typical embodiment, the MSC 18 is coupled to the gateway 22, and the gateway 22 is coupled to the Internet 24. In turn, electronic devices such as a laptop computer 30 (as shown) or any other processing elements (e.g., personal computers, server computers or the like) can be coupled to the terminal 10 via the Internet 24 by way of their own Internet connection 9. In a further embodiment, one or more processing elements associated with a CA server 26 may be coupled to this network 10 by way of the Internet 24.

In addition to cellular network communications 2, the terminal 12 may be equipped to communicate with other devices, such as mobile devices 28, 29, 30 via a local wireless network 3 and a close-range communication link 4. For example, in the FIG. 1 embodiment, the terminal 12 is configured to communicate with a first mobile device 28, a second mobile device 29 and a laptop computer 30, each equipped with an internal NFC protocol transceiver (e.g., for example an NFCIP-2 transceiver). The terminal 12 is also configured to communicate with these devices 28, 29, 30 via another longer range wireless communication link, such as a BlueTooth® or other local area wireless link 3. For example, the terminal 12 may include an NFCIP-2 NFC transceiver and an IEEE 802.11g wireless data network transceiver. Similarly, the mobile devices 28, 29 and the laptop computer 30 as illustrated are configured with compatible NFC protocol and local area (or wide area) wireless transceivers.

The close range communication transceivers in the terminal 12 and the other network devices 28, 29, 30 may be any of a number of different known transceivers (including for example RFID tags) capable of transmitting and/or receiving data in accordance with any of a number of different close range techniques, such as defined in the NFC protocols and standards listed above. For example, the NFC transceiver may be a NFCIP-1 or NFCIP-2 transceiver, an RFID transceiver or RFID tag, or use BlueTooth® (i.e., communication in the 2.4 GHz frequency band), infrared, IrDA (Infrared Data Association), UWB (Ultra Wideband) or other wireless communication links.

The terminal 12 and network devices 28, 29, 30 also include a second data communication link that can be used for securely transmitting data within the trust domain. For example, as illustrated in FIG. 1, the second data communication link may be a local area wireless link 3, such as according to the IEEE 802.11g standard. This second data communication link need not be wireless, and can be a wired local area network (not shown), such as a ring token network or an Ethernet network.

In addition to mobile devices 28, 29 and laptop computers 30, the network 10 may also or alternatively include any of a number of different electronic devices, including other mobile terminals, wireless accessories (e.g., mass storage devices, networked printers, monitors, etc.), portable digital assistants (PDAs), pagers, desk top computers, medical devices, data sensors, and other types of electronic systems.

FIG. 1 illustrates devices that may be members of a trust domain. For example, a trust domain may be established among the terminal 12, mobile devices 28, 29 and a laptop computer 30. An example of such a trust domain may be an office networked computer system that uses the terminal 12 as a hub for administering the trust domain. As another example, the trust domain may include mobile devices 28, 29 for remotely processing credit cards by communicating with a central data processor and communication hub (e.g., terminal 12). As a further example, the trust domain may include mobile physician assistant PDAs 28, 29 and remote terminals 30 for distributing patient records from and transmitting patient information to a central data processor and communication hub (e.g., terminal 12). In such examples, the trust domain is able to share data within the trusted devices via secure messages transmitted by a wireless data link 3. Such trust domain transmissions may be peer-to-peer links, such as illustrated between mobile device 28 and mobile device 29, or indirect network communications via the terminal 12, such as illustrated between the mobile devices 28, 29 and the laptop computer 30. Such a trust domain may also communicate with external websites and data sources, such as by the terminal 12 communicating via a cellular data communication link 2 with a base station 16 coupled to the Internet 24, or the laptop computer 30 connected directly to the Internet 24 as illustrated. Similarly, one or more of the mobile devices 28, 29 may also be able to communicate directly with the base station 16, such as by a cellular data communication link 2.

The architecture illustrated in FIG. 1 also supports trust domains that include distant elements, such as a server 26 coupled to the Internet 24. For example, a trust domain may be administered by CA server 26 via the Internet 24. Messages intended for the trust domain may be transmitted from the CA server 26 via the Internet 24 to a base station 16 and then to the terminal 12 as illustrated. From terminal 12, the trust domain messages may be rebroadcast via local wireless communication links 3 to the other group members 28, 29, 30. Messages from any member of the trust domain may then be routed to the CA server 26 in a reverse manner. Similarly, the trust domain may include computing devices that are beyond the range of the terminal 12, such as a computer coupled to the Internet 24. Messages to and among trust domain members may be directed to each member device using IP addresses and addressing schemes that are well known in the Internet arts.

While the protocols and methods for communicating to, from and within a trust domain are well known, the various embodiments provide new mechanisms for establishing a trust domain or for joining new members to an existing trust domain. By adding close range communication transceivers to the terminal 12 and member mobile devices 28, 29, 30, the proximity limitation of such transceivers is leveraged to make two unrelated devices, such as terminal 12 and mobile device 28, aware of each other. Thus, to add a first mobile device 28 to a trust domain including the terminal 12, the first mobile device is brought in very close proximity to the terminal 12. Using one of the known close range communication techniques, the first mobile device 28 and the terminal 12 establish a close range data link 4. Using the close range data link 4, the first mobile device 28 may send a request to the terminal 12 to be joined to a trust domain. Additional information such as device addressing, user notification, and/or trust domain participation confirmation may also be addressed at this point.

In an embodiment the first mobile device 28 and the terminal 12 have data connectivity via disparate physical links, e.g. an 802.11g wireless link 3 and a CDMA cellular data communication link 2 in addition to the close range link 4. In this embodiment, the trust domain can be established using the 802.11g wireless link 3, the CDMA cellular data communication link 2, or both. In a further embodiment, one or more of the group devices (e.g., the laptop computer 30) may include a wired network link 1 that can be used for trust domain communications.

Each device 12, 28, 29, 30 can use its close range communication transceiver to communicate with a new device and its secured communication link (e.g., wired, wireless and/or cellular links 1, 2 or 3) to notify other members of the trust domain that a new device has joined or asked to join the trust domain, and hence extend the trust domain. Thus, once a trust domain has been established, any member of the group having close range communication capability can join another device to the group by being placed in close proximity to the new device sufficient to establish a close range communication link 4. Since the networking authentication is established by bringing two devices in close proximity and the credentials, network and trust domain addresses and set up information are communicated via the close range communication link 4, joining a new device to an established trust domain can be completely transparent to the user.

The network 10 illustrated in FIG. 1 enables a variety of connections between mobile devices 28, 29 and other computing devices on the network, such as a laptop 30. For example, the trust domain can communicate by means of cellular communications networks 2, by local wireless networks 3, by wired network connections 1 accessed via cellular communication links 2 to the base station 16 via the MSC 18 and network 19, and via the Internet 24 by an Internet connection 9. This flexibility in network connections is illustrated with respect to the laptop 30 with dashed communications symbols. Once a trust domain has been authenticated by the short range communication link 4 procedures described herein, the trust domain devices may communicate with each other directly through secure peer-to-peer links or indirectly via networks 1, 2, 3, 9, or 24.

While FIG. 1 shows a terminal 12 to be an immobile terminal, this device may itself be a mobile device, such as a mobile device 29, laptop computer or personal computer on a mobile cart. For example, a mobile device 29 may serve as the hub of a trust domain including itself, the mobile device 28 and the laptop 30, with network communications including a cellular data network link 2 and a local area wireless link 3. In this example, once trust domain membership is confirmed by bringing a second mobile device 28 sufficiently close to the first mobile device 29 to establish the close range communication link 4, communications to, from and among the trust domain members may proceed according to well-known trust domain communication methods and protocols.

Each device that may be joined to a trust domain may be configured with application software to automatically negotiate the creation of a trust domain when any two devices are brought in close proximity. Similarly, the devices may be configured with application software to automatically join one device to an established trust domain of which the other device is a member when the two devices are brought into close proximity. Such applications using the communication capabilities of close range communication transceivers can eliminate much of the complexity of establishing secure trust domains. The need for users to enter group identification and communication link information into one or more devices is replaced by a requirement that two devices be touched (or nearly touched) together. In this manner, an extensive trust domain can be quickly configured by simply touching the various member devices together in sequence.

In addition to providing a simple mechanism for establishing or expanding a trust domain, the various embodiments provide a secure mechanism for exchanging trust domain communication, identification and address information. Since close range communication links 4 are by definition very short range, they are resistant to eavesdropping and interference from other devices. For example, FIG. 1 shows the mobile device 28 sufficiently close to the terminal 12 to establish an NFC link 4, while other members of the group (such as mobile device 29 and laptop computer 30) cannot receive or interfere with that communication. Since credential security and addressing information are not exchanged over wide-area communication links 2, 3, there is low risk of inadvertent joining of devices, or disclosing credential information to eavesdroppers. Thus, a secure trust domain can be quickly formed in a public location without users having to engage in cumbersome security procedures.

While FIG. 1 is described above as being based upon a cellular data network, the same basic architecture may be implemented with other wireless network technologies, such as a WiFi or WiMax network. In such alternative wireless technologies, the base station 16 would be a WiFi or WiMax (for example) base station. Other elements of such a network 10 would be substantially the same as shown in FIG. 1 and described above, except that the terminal 12 and other network elements 28, 29, 30 would be configured to communicate using the WiFi (or other) wireless communication protocol. Accordingly, a separate figure for depicting alternative wireless and wired communication technology networks is unnecessary, and references to components in subsequent figures using reference numerals shown in FIG. 1 are intended to encompass both cellular and other wired and wireless network elements. Similarly, the terminal 12 may be coupled to a local area network 19 by a wired connection (similar to the wired network connection 1 shown in coupling to the laptop 30), and need not include a cellular network transceiver.

Figure 2:
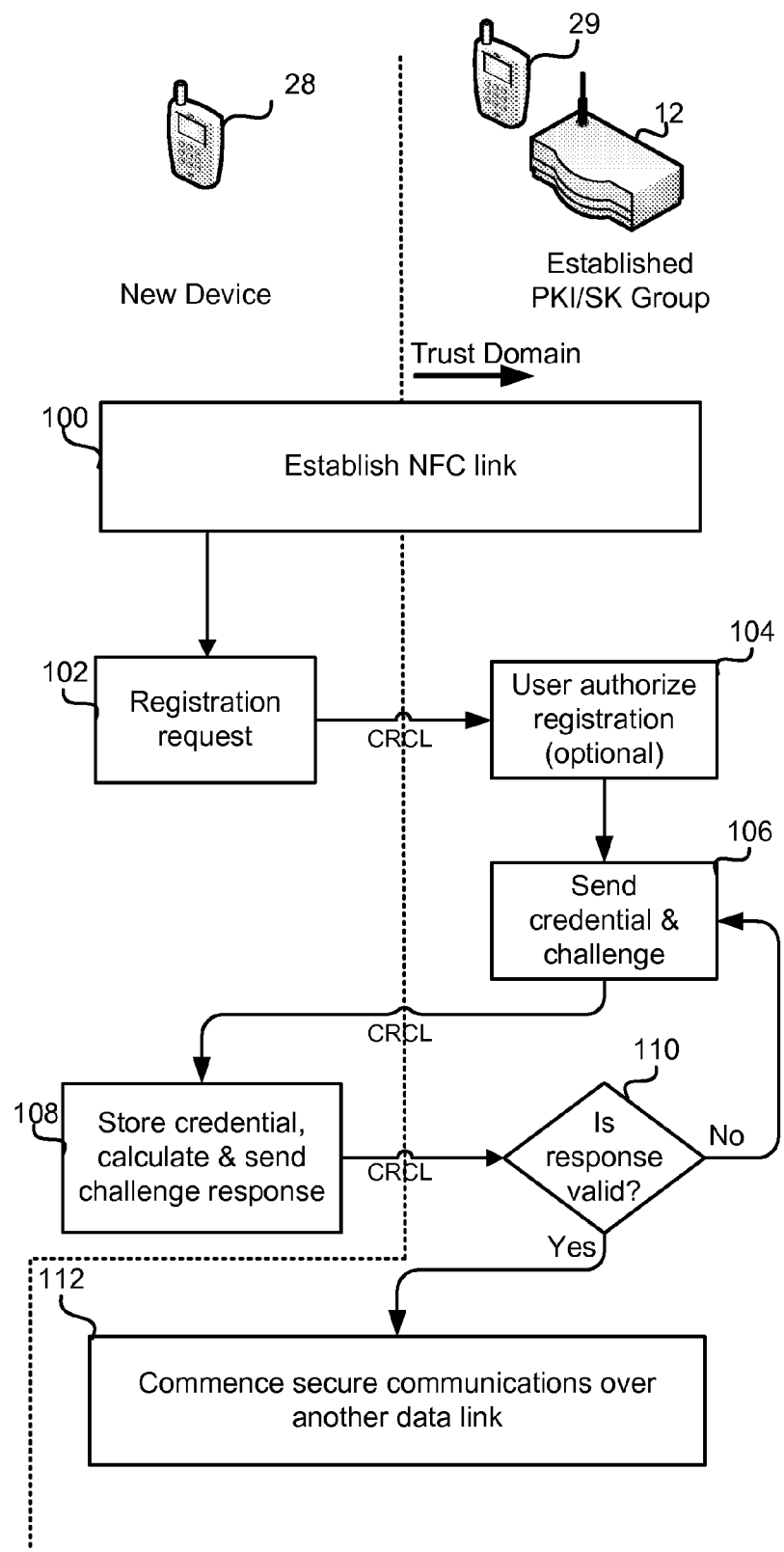
FIG. 2 is a process flow diagram of an embodiment method suitable for joining a device to a trust domain.
Figure 3:
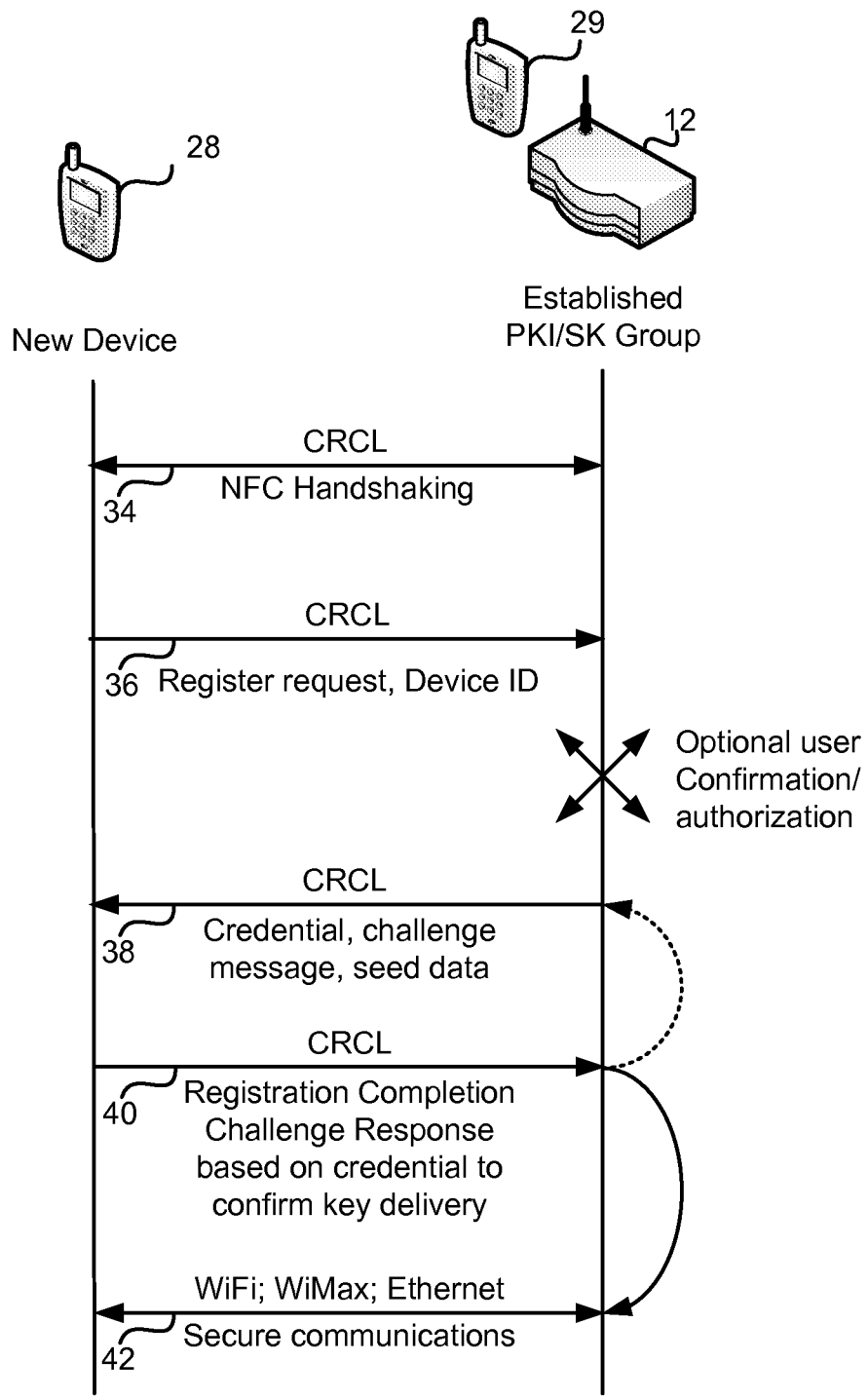
FIG. 3 is a message flow diagram of the embodiment for establishing a trust domain illustrated in FIG. 2.

In a first embodiment illustrated in FIGS. 2 and 3, a new device 28 is connected to an existing trust domain among the mobile device 29 and terminal 12. Such a trust domain may be based upon shared credential information (e.g., a PKI set of an encryption key credentials) as is well known in the art. When the new device 28 is to be joined to the trust group, it is brought into close proximity with the terminal 12 or the other mobile device 29 so that a close-range communication link is automatically established; step 100, messages 34. The process of establishing a close-range communication link 4 may involve a series of handshaking communication exchanges encompassed within messages 34. For example, any of the known NFC protocol link establishment methods may be employed. Over the established close-range communication link 4, the new device 28 may request registration with the trust domain, step 102, such as by transmitting its device ID and a standard request message, message 36. In response, the receiving device, whether terminal 12 or mobile device 29, may send the security credential to the new device 28 along with a challenge message over the close range communication link 4; step 106, message 38. This message may also include seed data for security credentials if such encryption technology is used. Upon receiving the credential and challenge message, the new device may store the credential information and then calculate the appropriate response to the challenge and send the response back to the terminal or mobile device 29 over the close range communication link 4; step 108, message 40. The receiving device, whether terminal 12 or mobile device 29, checks the challenge response message to confirm that the value is correct, test 110. If the value is correct, this indicates that the credential was accurately received and is being properly processed by the new device 28, enabling the trust domain to be extended to the new device 28 so secure communications can begin over the trust domain data link, step 112. If however, the challenge response is incorrect, indicating that the credential was not properly received, the terminal 12 or mobile device 29 may resend the credential, repeating step 106 and resending message 38.

Prior to sending the trust domain credential, step 106, a user of the terminal 12 or mobile device 29 may be requested to perform an action to acknowledge and authorize the registration, optional step 104. This may be in the form of a request for the user to confirm the intent to admit the new device 28, such as by pressing the letter "Y" on a keypad, or entering a password or submitting to a biometric scanner to confirm that the user is someone who can authorize extending the trust domain to the new device 28.

As part of this process, such as a step in the process of establishing communications over the trust domain communication link, step 112, the user of the new device 28 may be notified that the device is being added to the trust domain. Such a notification may be in the form of a message presented on the mobile device display. Similarly, the device admitting the new device 28 to the trust group may inform other devices within the trust domain, as well as notify a user, that the new device is being added, such as by communicating a message to be presented on each devices' display.

In an embodiment, the receiving device (i.e., terminal 12 or mobile device 29) may provide the credential and challenge, step 106 and message 38, without receiving a request for registration from the new device 28. In this embodiment, the process of establishing the close range communication link, step 100 and messages 34, prompts the receiving device to extend the trust domain credential.

From a user's perspective, the steps of joining a new device 28 to a trust group consists only of touching or nearly touching the new device 28 to a device that is part of the trust group, such as the terminal 12 or mobile device 29, step 100. Quickly thereafter the user of the new device 28 receives a notification (e.g., an optional display notification or operation of the device) that secure communications have been enabled, step 112. Thus, to the user, the process of joining a new device 28 to a trust group could hardly be easier. Even if the user is prompted to enter a password or biometric scan as in an embodiment described in more detail below, the complexity of deploying and verifying credentials and confirming secure communication capabilities are hidden from the user.

Figure 4:
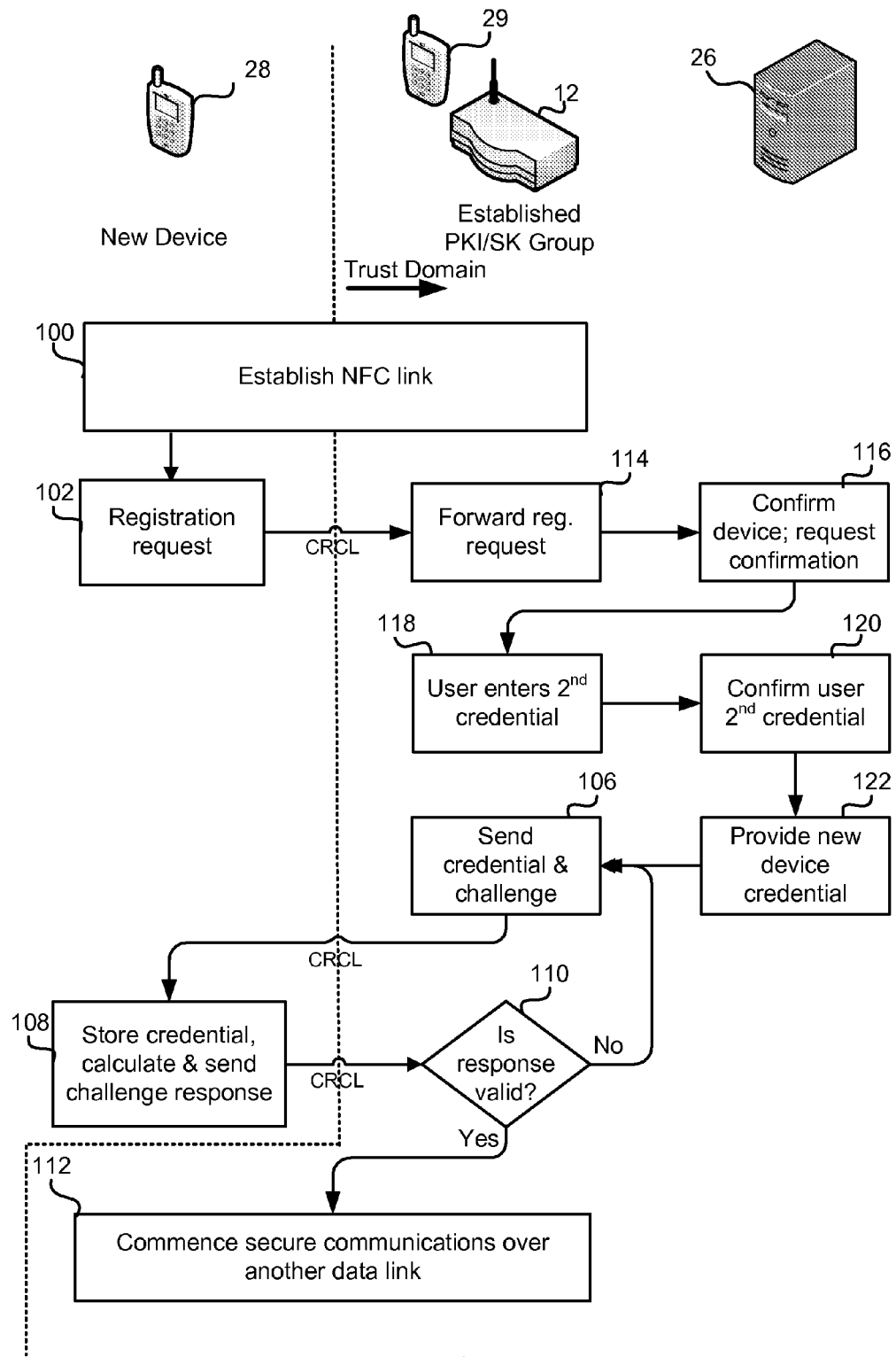
FIG. 4 is a process flow diagram of another embodiment method suitable for establishing a trust domain.
Figure 5:
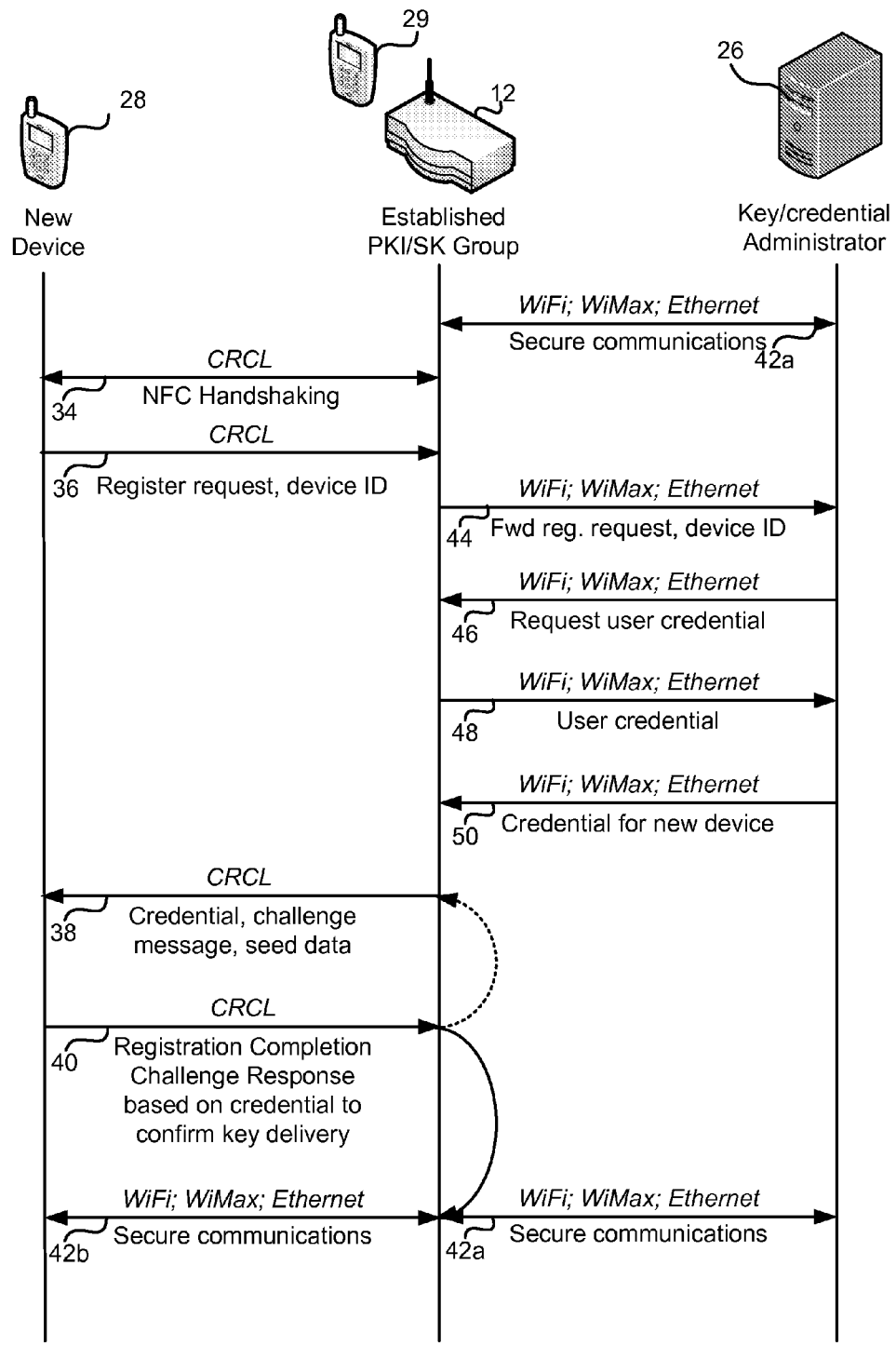
FIG. 5 is a message flow diagram of the embodiment for establishing a trust domain illustrated in FIG. 4.

In an embodiment, the trust domain may be managed by a server within the trust domain, such as a CA server 26. Example processes and messages for admitting a new device 28 to such a trust domain are illustrated in FIGS. 4 and 5. In this example, secured communications are already established between members of the trust domain (e.g. the terminal 12 and mobile device 29) and the CA server 26, messages 42a. Similar to the embodiment described above, when a new device 28 is to be added to the established trust domain, the new device 28 is brought in close proximity to a member of the trust domain (e.g., the terminal 12 and mobile device 29) to establish a close range or NFC communication link; step 100, messages 34. With the close range communication link established, the new device 28 requests registration with the trust domain; step 102, message 36. In this embodiment, membership within the trust domain is managed by the CA server 26, so upon receiving the registration request, the receiving device (e.g., the terminal 12 or mobile device 29) forwards the request to the CA server 26; step 114, message 44. Since the receiving device was within the trust domain, the message forwarding the registration request may be sent to the CA server 26 using the secured wireless or wired network communication. The CA server 26 receives the request, confirms any device information provided along with the request, and confirms the request to add the new device 28 to the trust domain, step 116.

Since the CA server 26 is not in close proximity or communication contact with the new device 28, it may send a request to the device which forwarded the registration request (e.g., the terminal 12 and mobile device 29) asking a user of that device to enter another credential to indicate agreement with joining the new device 28; step 118, message 46. This request for a second credential from a user within the trust domain may be transmitted using the secure communication link of the trust group. This request may be for a simple user confirmation action (e.g., a request to press the letter "Y" key if the user agrees), for entry of a password known to the CA server 26, entry of a biometric scan (e.g., such as a request to scan the users finger over a fingerprint scanner included within the user's device), or some other credential that the CA server 26 can recognize as indicating user agreement with adding the new device 28 to the trust domain. In response, the user performs the requested action, step 118, which is transmitted to the CA server 26, message 48. Again, this second user credential may be transmitted over the secured communication network of the trust domain.

The CA server 26 then confirms the user's second credential, step 120. The second credential may be confirmed using a variety of known methods. For example, if the second credential is a password, the CA server 26 may compare the received password to a list (e.g., a database listing) of passwords assigned to individuals authorized to admit new devices to the trust domain. For example, certain individuals in an organization, such as loan officers in a bank or information technology (IT) professionals within a company, may be authorized to distribute credential information to new devices, such as laptop computers or new hardware installations. To ensure the addition of a new device to a trust domain is being initiated by a trusted individual, the CA server may be configured with a list of passwords assigned to such individuals. To provide a higher level of security, mobile devices assigned to such trusted individuals may be configured with biometric sensors, such as a finger print scanner 179 (see FIG. 15) with biometric data of authorized users stored in a database on the CA server 26. In such implementations, the CA server 26 can verify that the user requesting the addition of a new device 28 to the trust domain is authorized to do so by comparing biometric data received from the user's mobile device 29 to biometric data of authorized users stored in a database maintained on or accessible by the CA server 26.

If the CA server 26 confirms the user's second credential, it transmits the credential to be passed to the new device 28; step 122, message 50. This credential message is sent to the member of the trust domain which received the initial registers request, such as the terminal 12 or mobile device 29. Alternatively, the CA server 26 may simply authorize the receiving device (e.g., the terminal 12 and mobile device 29) to forward on the credential used to establish the trust domain. That device then sends the credential along with a challenge message to the new device 28; step 106, message 38. Since the new device 28 is not yet a member of the trust domain, the credential and challenge message is sent via the close range communication link. As described above with reference to FIG. 2, the new device 28 stores the credential, calculates the appropriate response to the challenge, and sends the challenge response back to the member of the trust domain which is in close proximity (e.g., the terminal 12 or mobile device 29); step 108, message 40. The receiving device checks the challenge response message to confirm that the value is correct, test 110. If the value is correct, this indicates that the credential was accurately received and is being properly processed by the new device 28, enabling the trust domain to be extended to the new device 28 so secure communications can begin over the trust domain data link; step 112, messages 42*a*, 42*b*. If, however, the challenge response is incorrect, indicating that the credential was not properly received, the terminal 12 or mobile device 29 may resend the credential, repeating step 106 and resending message 38.

In an embodiment, the receiving device (i.e., terminal 12 or mobile device 29) may forward a request for registration of the new device 28 to the CA server 26, step 114 and message 44, without receiving a request for registration from the new device 28. In this embodiment, the process of establishing the close range communication link; step 100, messages 34, may prompt the receiving device to inform the CA server 26 that a new device 28 is attempting to join the trust domain. This automatic notification may be sufficient to enable the CA server 26 to confirm the addition of the new device 28, step 116, and request the receiving device to enter a credential in order to consent to adding the device 28 to the trust domain, step 118.

Figure 6:
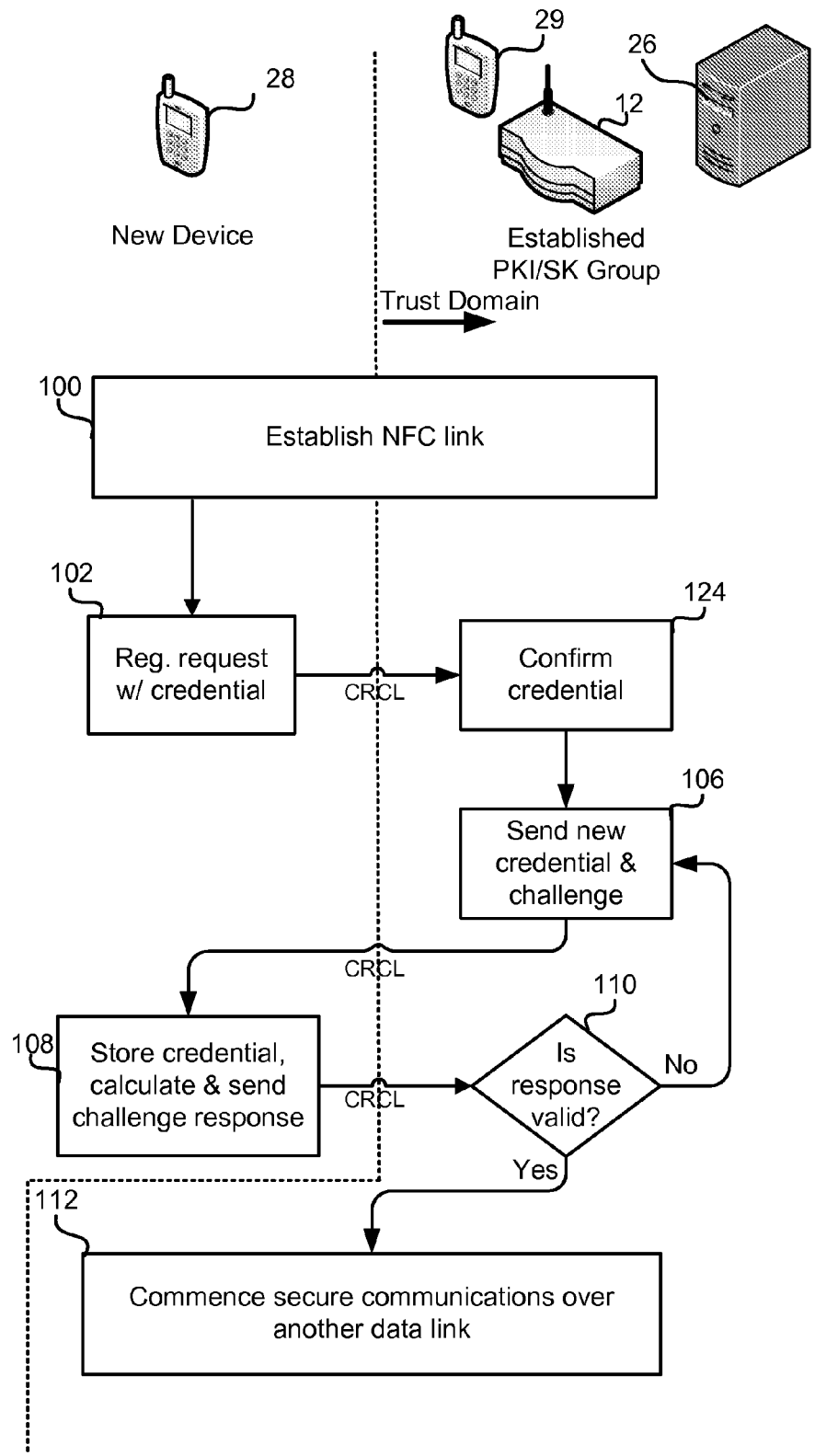
FIG. 6 is a process flow diagram of another embodiment method suitable for establishing a trust domain.

In some instances, a new mobile device 28 may include credential information, such as a digital signature, stored in the device by the original equipment manufacturer or a service provider. Such credential information may be useful to enabling a trust domain administrator (such as a CA server 26) to determine whether the new device should be added to the trust domain. Such credential information may be verified using any known method including, for example, PKI methods. Accordingly, in an embodiment illustrated in FIGS. 6-8, the credential stored on the new device 28 is confirmed as part of the process of deciding whether to add the device to the trust domain. Referring to FIG. 6, in one implementation, the new mobile device 28 is brought into close proximity with a member of the established trust domain in order to establish a close range communication link, step 100. The new device 28 then sends its preloaded credential along with a registration request over the close range communication link to a member of the established trust domain, step 102. This message is similar to the registration request message 36 illustrated in FIG. 3 with the addition of the device's credential information. Upon receiving the credential, a member of the trust domain, such as the CA server 26, confirms the credential using known methods, such as PKI methods, step 124. If the credential is valid, the trust domain, such as the CA server 26, can confirm the origin of the new device 28, and proceed to issue credential information along with a challenge request, step 106. This method then continues in the manner described above with reference to FIGS. 2 and 3 for steps 108, 110, and 112.

Figure 7:
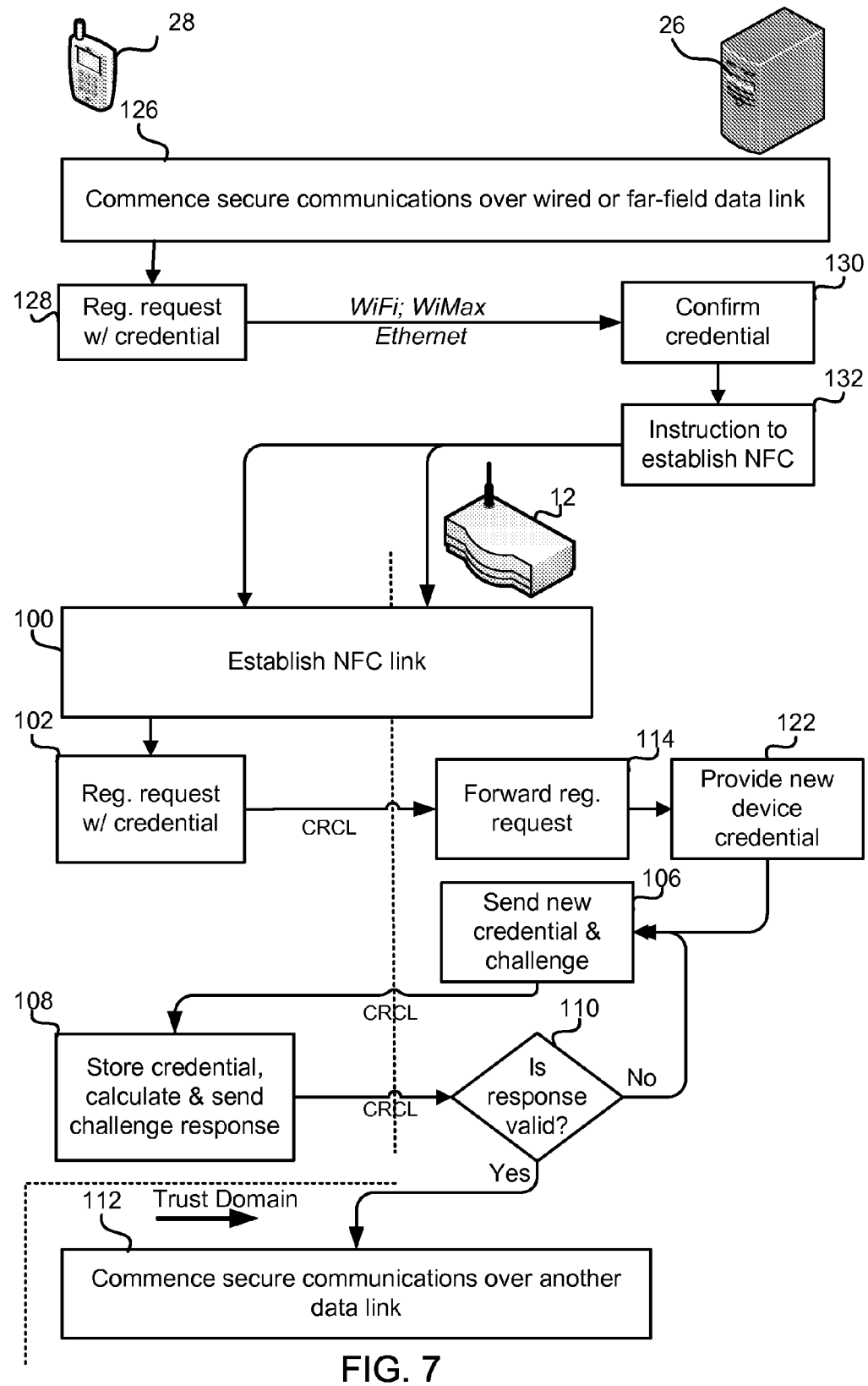
FIG. 7 is a process flow diagram of another embodiment method suitable for establishing a trust domain.
Figure 8:
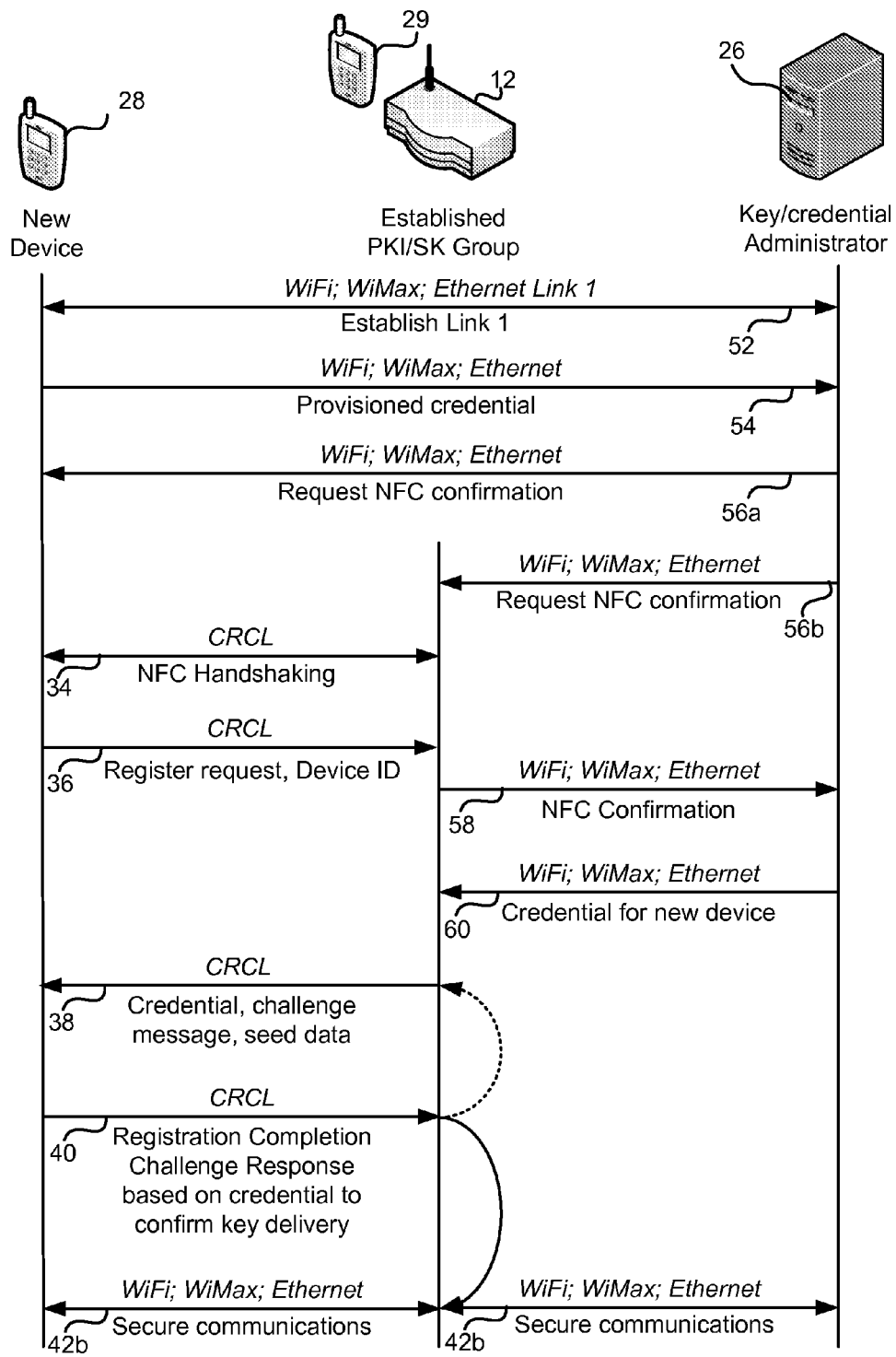
FIG. 8 is a message flow diagram of the embodiment for establishing a trust domain illustrated in FIG. 7.

In a second implementation, the new device 28 may use its preloaded credential information to secure a first communication link with a CA server 26 and then request entry into a trust domain to receive a new service. As illustrated in FIGS. 7 and 8, the new device 28 may establish a secure wired or wireless communication link with a CA server 26 using its preloaded credential; step 126, messages 52. Using this secure link, the new device 28 may then request registration for the new service; step 128, message 54. In response, the CA server 26 may confirm the credential of the new device 28, step 130. If the new device 28 credential is confirmed, the CA server 26 may send an instruction to the new device 28 and another device within the trust domain including the new service, such as the terminal 12, to enter into a close range communication link; step 132, messages 56a and 56b. A user of the new device 28 (and/or a user of the terminal 12) receiving the instruction to establish a close range communication link may then bring the device into close proximity with the terminal 12; step 100, messages 34. Once the close range communication link is established, the new device 28 may send a registration request to the terminal 12 over the close range communication link; step 102, message 36. The terminal 12 may then forward a confirmation message to the CA server 26 indicating that a proximity event has occurred with the new device 28; step 114, message 58. In response, the CA server 26 may provide the credential to be used by the new device 28 to the terminal 12; step 122, message 60. At this point, the method and messages proceed substantially as described above with reference to FIGS. 4 and 5 to extend the trust domain to include the new device 28.

Figure 9:
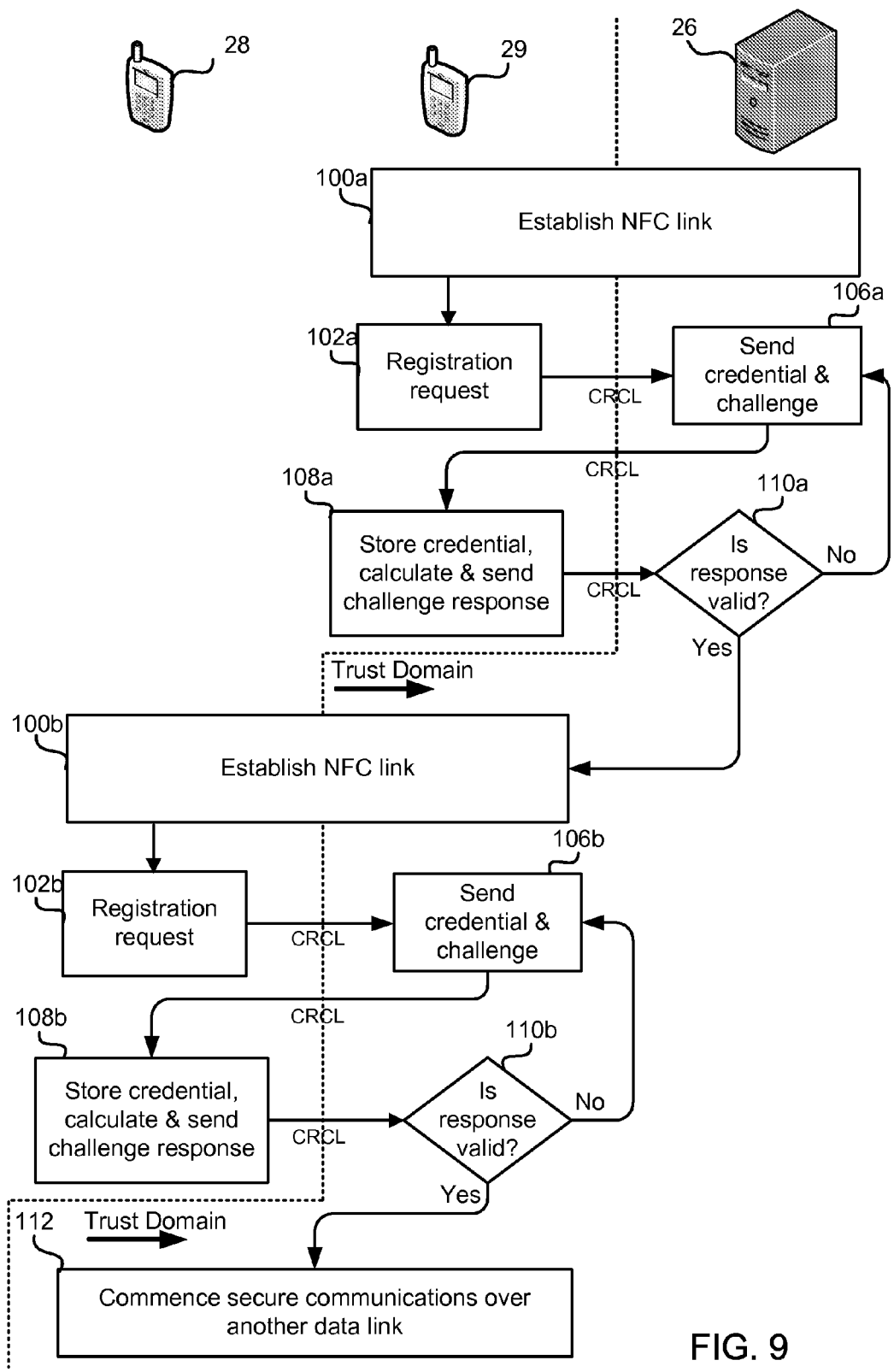
FIG. 9 is a process flow diagram of an embodiment method suitable for establishing a trust domain among a number of devices.
Figure 10:
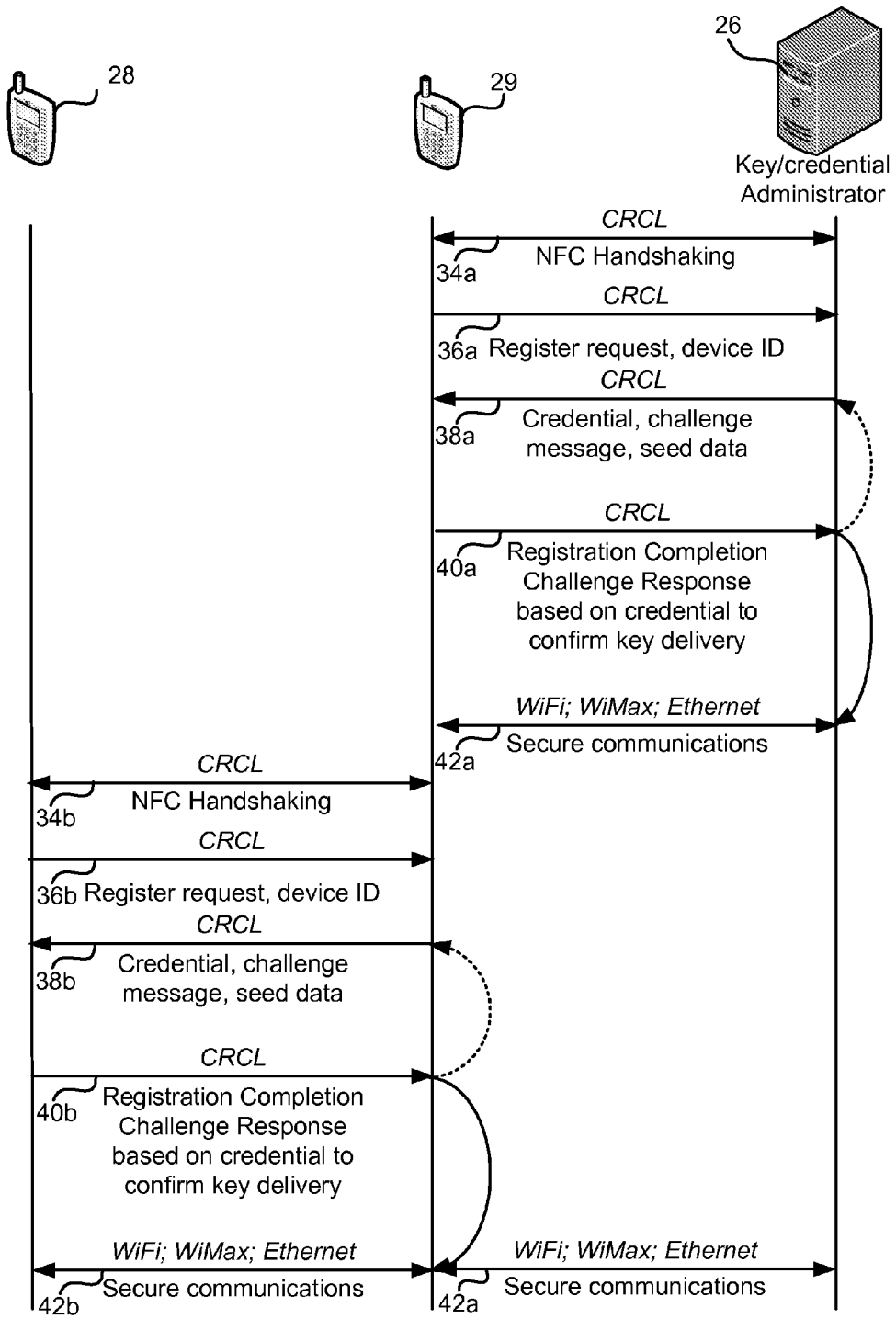
FIG. 10 is a message flow diagram of the embodiment for establishing a trust domain illustrated in FIG. 9.

In a further embodiment, the methods and systems described herein may be used to extend a trust domain from a CA server 26 to a first device 29 and then on to a second device 28 (and so on). As illustrated in FIGS. 9-10, a first mobile device 29 may be brought into close proximity with the CA server 26 in order to establish a close range communication link; step 100a, messages 34a. The first device 29 may request registration with the CA server 26, step 102a and message 36a, and in response the CA server 26 sends a credential and challenge message, step 106a and message 38a. The trust server 26 may send the credential and challenge message, step 106a, message 38a, without prompting from the first device 29, relying instead upon the establishment of a close range communication link, step 100a. As described above with reference to FIGS. 2 and 3, the first mobile device 29 stores the credential, calculates a response to the challenge request, and transmits the challenge response back to the trust server 26; step 108a, message 40a. The trust server 26 verifies that the challenge response is valid, test 110a, repeating the step of sending the credential and challenge request, step 106a, if the response is not valid.

If the new device 29 successfully received the credential (i.e., test 110a="Yes"), the new device 29 is moved within the trust domain and now can be used to extend the trust domain to other devices. For example, a user of the first device 29 may bring it within close proximity to a second device 28 in order to establish another close range communication link; step 100b, messages 34b. The process of requesting registration, and sending credentials, confirming that credentials were properly received and commencing secure communications over the trust domain communication link, steps 102b through 112, then proceed in a manner substantially the same as the similarly labeled steps described above with reference to FIGS. 2 and 3.

This embodiment has a number of useful applications for distributing credentials using a mobile device 29 as a means for linking a number of other devices into the trust domain.

The foregoing embodiments have been described as extending an existing credential from an established trust domain to a new device 28. However in another embodiment, the CA server 26 may issue a new credential when a new device 28 requests to join the trust domain. This embodiment may be useful when the entry of the new device 28 requires a different level of security or there is a need to avoid disclosing the previous credential to the new device 28.

Figure 11:
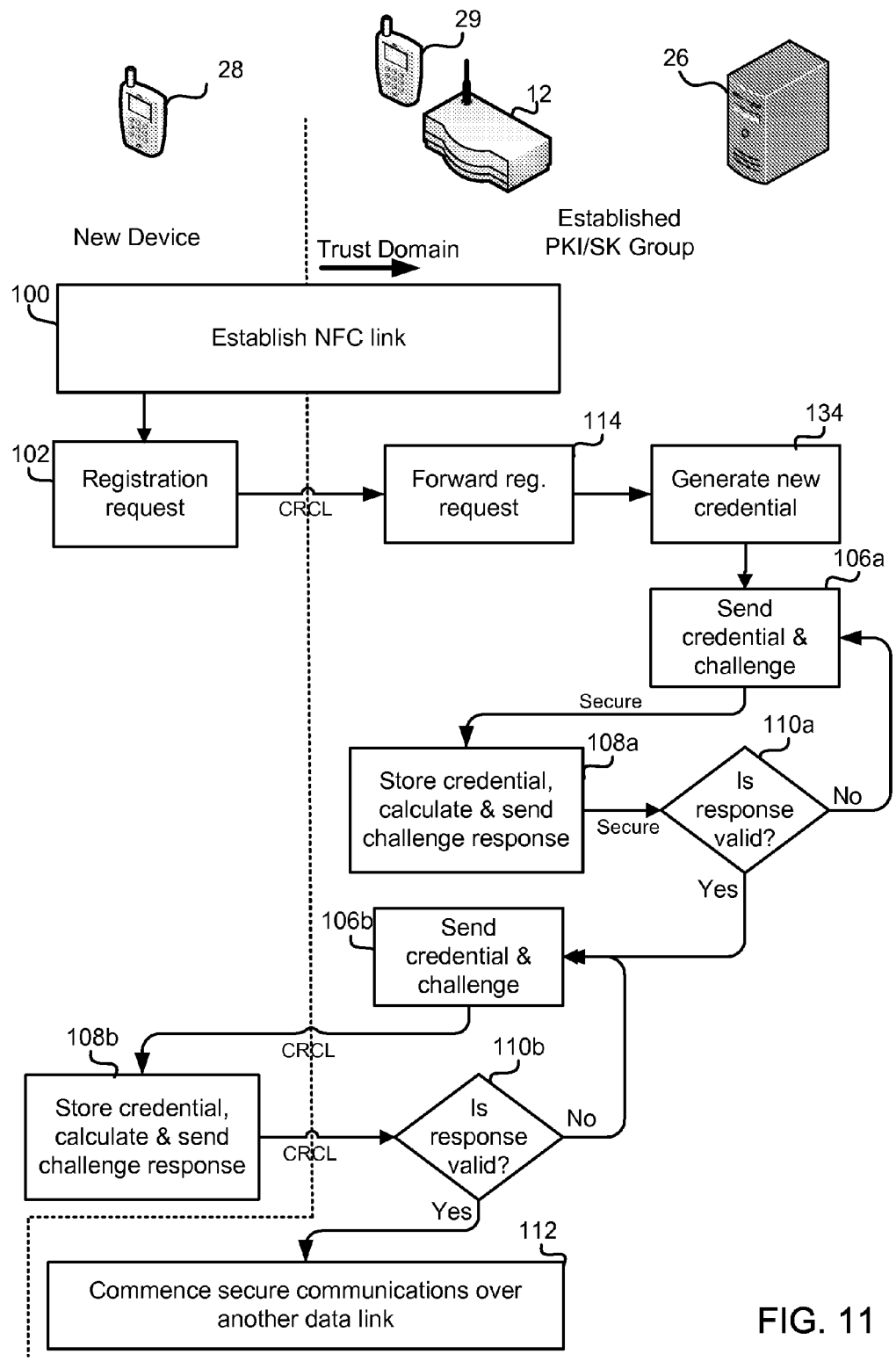
FIG. 11 is a process flow diagram of another embodiment method suitable for establishing a trust domain.
Figure 12:
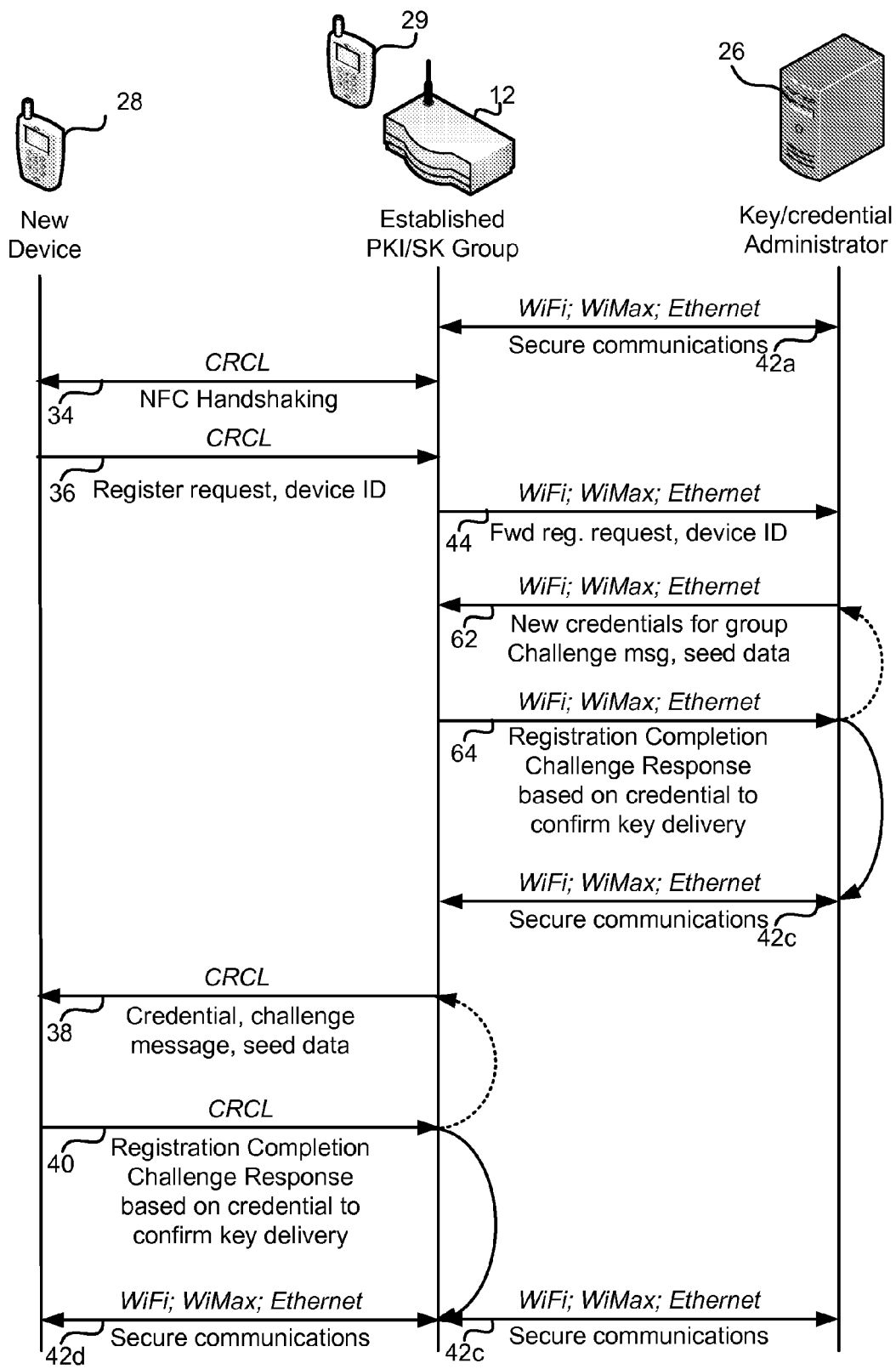
FIG. 12 is a message flow diagram of the embodiment for establishing a trust domain illustrated in FIG. 11.

In this embodiment, which is illustrated in FIGS. 11 and 12, a new device 28 seeks to join a trust domain by establishing a close range communication link, step 100 and messages 34, and transmitting a registration request to a member of the trust domain, step 102 and message 36, in a manner similar to those described above with reference to FIGS. 4 and 5. A member device (e.g., terminal 12 or mobile device 29) receiving a registration request from the new device 28 pass the request on to a CA server 26; step 114 and message 44. Upon receiving the relayed registration request, the CA server 26 may generate a new credential to be used to establish the trust domain, step 134. This new credential(s) will replace the present credential(s) used by members of the trust domain so that the new device 28 can be admitted to the trust domain. To do so, the CA server 26 sends the new credential along with a challenge request to each member of the trust domain, step 106a and message 62. FIG. 11 shows the delivery of new credential information being passed from the CA server 26 to a member of the trust domain, such as the terminal 12, but the new credential may also be passed from one member to the next in a manner similar to that described above with reference to FIGS. 9 and 10. As described above for other embodiments, each device receiving a new credential stores the credential, calculates an appropriate response to the challenge request and transmits that challenge response back to the device which provided the credential; step 108a and message 64. The challenge response is checked for validity, test 110a, so that if the credential was not properly delivered it can be retransmitted, step 106a. Since the members of the trust domain already have secure communications established, the transmission of the new credential can be made using that link, as shown in FIG. 12, without the need to establish close range communication links between each pair of devices within the trust domain. While FIGS. 11 and 12 illustrate passing credentials to only a single member of the trust domain, the various steps may be repeated until all members of the trust domain have received the new credential.

Once the new credential has been deployed within the trust domain, one of members of the trust domain can pass the credential on to the new device 28 using the established close range communication link. This can be accomplished in steps 106b-112 and messages 38 and 40 in a manner substantially the same as described above with reference to FIGS. 9 and 10 for like numbered steps and messages.

In any of the foregoing embodiments, as part of the process of admitting a new device 28 to the trust domain, the user of the new device 28 may be prompted to enter an identifying credential, such as a password or a biometric identifier, in order to confirm the user's identity or prior authorization to join the trust domain. Such a prompt may be generated as part of the process of establishing the close range communication link, step 100, and may be presented to the user on a display of the new device 28. If the user is prompted to enter a password, the user may do so by using a keypad or keyboard on the new device 28. If the user is prompted to enter a biometric identifier, the user may use a biometric sensor on the new device 28 to enable the new device to obtain biometric information that it can forward to the requesting device. For example, the new device 28 may include a finger print scanner 179 (see FIG. 15) enabling the user to provide a finger print image or scan as a biometric identifier. As another example, the user may speak a password phrase into a microphone of the new device 28 in order to provide a voice print or audio file suitable for voice print identification. Other biometric credentials may also be used. The user identifier information (password, biometric identifier or other credential) may be passed to the requesting device within the trust domain via the close range communication link 4 as part of the registration request, step 102 and message 36, or as a separate step and message (not shown). As described above with reference to FIG. 4, a CA server 26 can confirm the user's identity based upon a password, by comparing the received password to a list of passwords assigned to individuals authorized to register with a trust domain. Similarly, a CA server 26 can confirm the user's identity based upon biometric data, by comparing the received biometric data to biometric data of individuals authorized to register with a trust domain.

Figure 13:
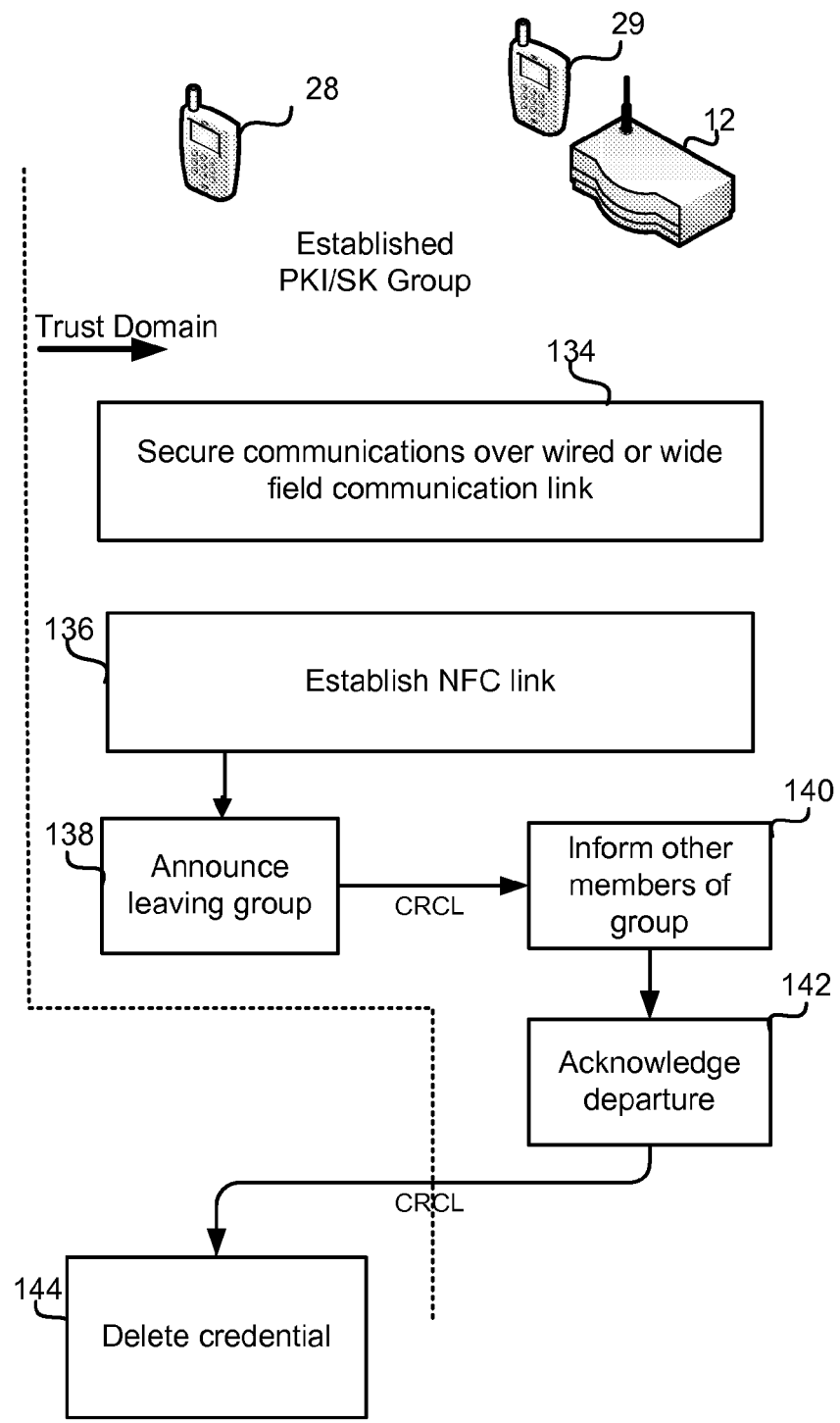
FIG. 13 is a process flow diagram of an embodiment method suitable for removing a device from a trust domain.
Figure 14:
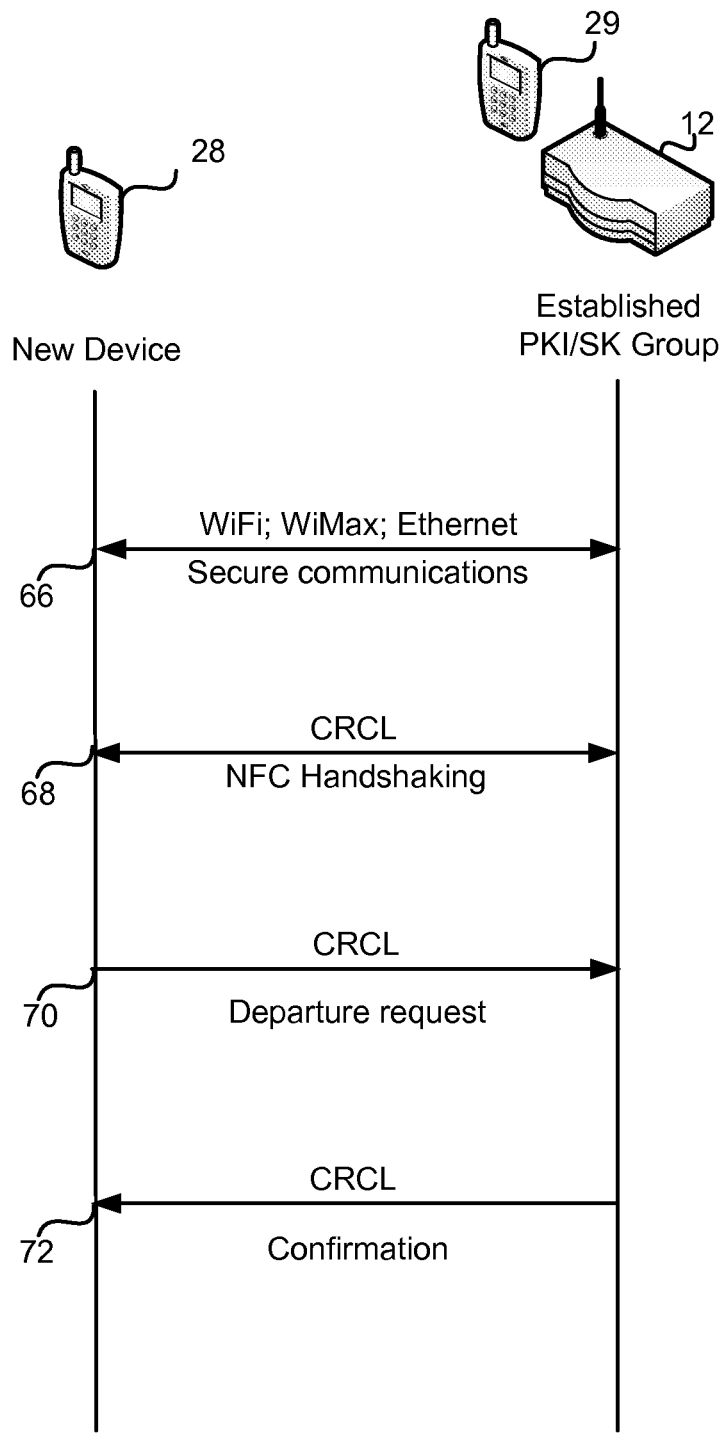
FIG. 14 is a message flow diagram of the embodiment for removing a device from a trust domain illustrated in FIG. 13.
Figure 15:
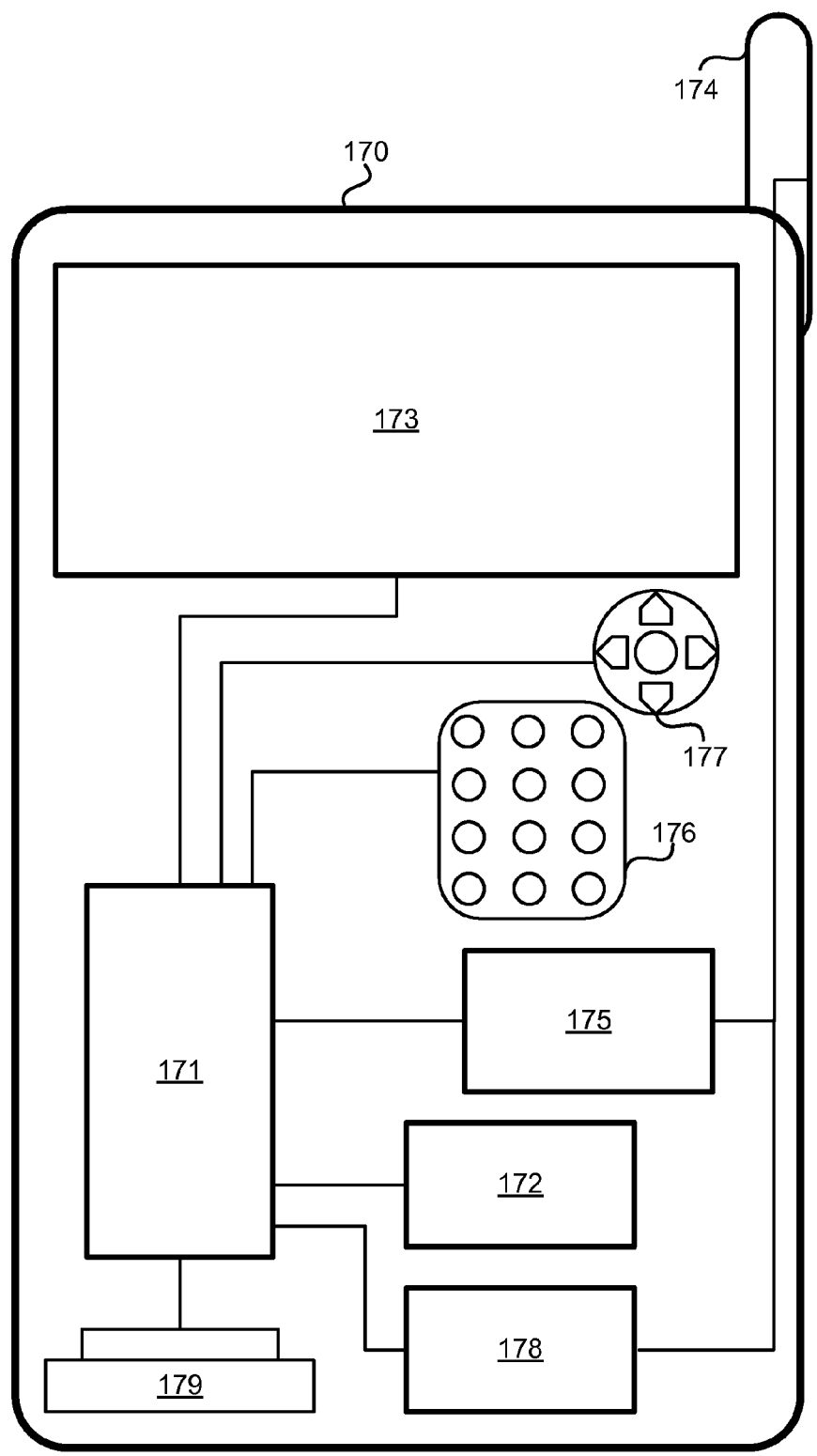
FIG. 15 is a circuit block diagram of an example mobile device suitable for use with the various embodiments

In an embodiment, a proximity event may also be used as part of the process of removing a device from a trust domain. For example, as illustrated in FIGS. 13 and 14, a mobile device 28 that is a member of the trust domain is able to engage in secure communications over the wired or wireless communication link enabled by the domain encryption credentials, step 134 and messages 66. To remove the mobile device 28, a user may bring the device in close proximity to another member of the trust domain, such as the terminal 12, which automatically causes the establishment of a close range communication link; step 136 and messages 68. The mobile device 28 may then send a message via the close range communication link to the terminal 12 announcing a desire to leave the trust domain; step 138 and message 70. Upon receiving that message, the terminal 12 may send messages via the trust domain communication link informing other members of the trust domain that the mobile device 28 is about to depart, step 140. The terminal 12 may also receive confirmation from the CA server 26 that departure of the mobile device 28 is permissible. At this point, the terminal 12 may send a message to the departing mobile device 28 confirming or acknowledging that the departure request has been received; step 142 and message 72. At that point, the mobile device 28 may delete the key credential, step 144, thereby taking itself out of the trust domain. In an embodiment, the CA server 26 may want to transmit a new credential to remaining members within the trust domain in order to ensure that the departing mobile device 28 is not able to reestablish security communications without repeating the credential deployment methods of the various embodiments. In a variation on this embodiment, the indication of a desire to leave the trust domain may be transmitted to other members of the trust domain by the leaving mobile device 28 using the secure communication link. The desire to leave the trust domain may then be communicated by the leaving mobile device 28 to the terminal 12 using the close range communication link 4. The terminal 12 can then inform the rest of the trust domain that the first mobile device 28 is no longer a member of the group.

Including a step of creating a close range communication link in order to remove a device from a trust domain provides an added layer of security in the form of a physical movement (i.e., bringing the departing device into close proximity with the terminal 12). This added step reduces the chance that devices are inadvertently dropped from a trust domain. Of course, devices may also exit a trust domain by being turned off or transmitting messages communicating a desire to leave the domain via the established trust domain communication link.

The embodiments described above may be implemented on any of a variety of mobile handsets, such as, for example, laptop computers, cellular telephones, personal data assistants (PDA) with cellular telephone, mobile electronic mail receivers, mobile web access devices, and other processor-equipped devices that may be developed in the future that connect to a wireless network. Typically, such mobile handsets will have in common the components illustrated in FIG. 15. For example, the mobile handset 170 may include a processor 171 coupled to internal memory 172 and a display 173. Additionally, the mobile handset 170 will have an antenna 174 for sending and receiving electromagnetic radiation that is connected to a wireless data link and/or cellular telephone transceiver 175 coupled to the processor 171. In some implementations, the transceiver 175 and portions of the processor 171 and memory 172 used for cellular telephone communications is referred to as the air interface since it provides a data interface via a wireless data link. Additionally, the mobile handset 170 will include a close range transceiver 178 capable of establishing and communicating a close range communication link, such as using one of the near field communication protocols. In some embodiments, the mobile handset 170 will include biometric sensors, such as a finger print scanner 179 that can obtain a biometric image of a user and pass the data to the processor 171. Mobile handsets typically include a key pad 176 or miniature keyboard and menu selection buttons or rocker switches 177 for receiving user inputs.

Figure 16:
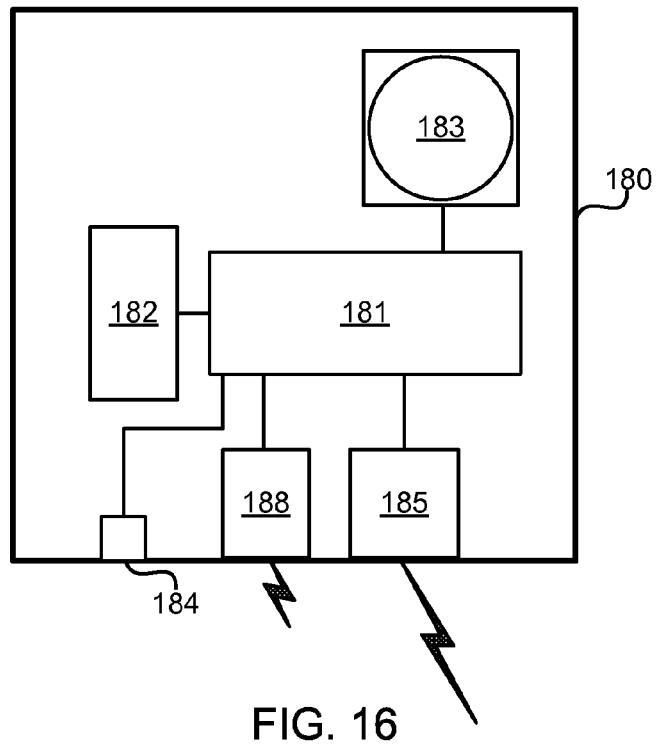
FIG. 16 is a circuit block diagram of an example computer or other programmed device suitable for use with the various embodiments

The embodiments described above may also be implemented on any of a variety of other computing devices, such as, for example a personal computer 180 illustrated in FIG. 16, processor-equipped components (e.g., an IV pump 214 or an ECG monitor 216 shown in FIG. 18), and other smart devices. Such a personal computer 180 typically includes a processor 181 coupled to memory 182 and a large capacity memory, such as a disk drive 183. The computer 180 may also include a network connection circuit 184 for coupling the processor to a wired network. Additionally, the computer 180 may include a medium to long range wireless transceiver 185 such as a WiFi or BlueTooth® transceiver coupled to the processor 181 for transmitting and receiving data via a wireless data network. Also, the computer 180 used in the various embodiments includes a close range communication transceiver 188 which is configured to send and receive data over a very short range wireless data link. For example, the close range communication transceiver 188 may be an NFC protocol transceiver or an RFID reader. So configured, the computer 180 can establish close range communication links with other devices, such as the mobile device 170 shown in FIG. 15, in order to accomplish the methods of the various embodiments.

Figure 17:
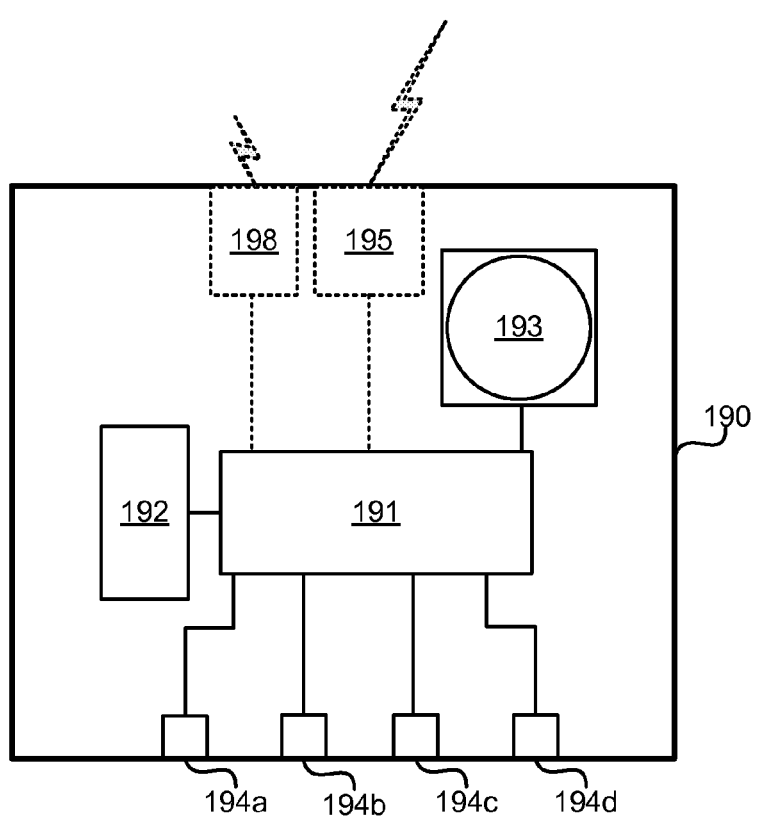
FIG. 17 is a circuit block diagram of an example server suitable for use with the various embodiments

The embodiments described above may also be implemented on any of a variety of server and network administrator systems, such as, for example a network server 190 illustrated in FIG. 17. Such a server 190 typically includes a processor 191 coupled to memory 192 and a large capacity memory, such as a disk drive 193. The server 190 may also include a plurality of network connection circuits 194a-194d for coupling the processor to a wired network, such as the Internet. Optionally, the server 190 may also include a medium-to-long range wireless transceiver 195 such as a WiFi transceiver coupled to the processor 191 for transmitting and receiving data via a wireless data network. Also, the server 190 optionally may include a close range communication transceiver 198 which is configured to send and receive data over a very short range wireless data link. For example, the close range communication transceiver 198 may be an NFC protocol transceiver or an RFID reader. So configured, the server 190 can establish close range communication links with other devices, such as the mobile device 180 shown in FIG. 15 or the computer 180 shown in FIG. 16, in order to accomplish the methods of the various embodiments.

Figure 18:
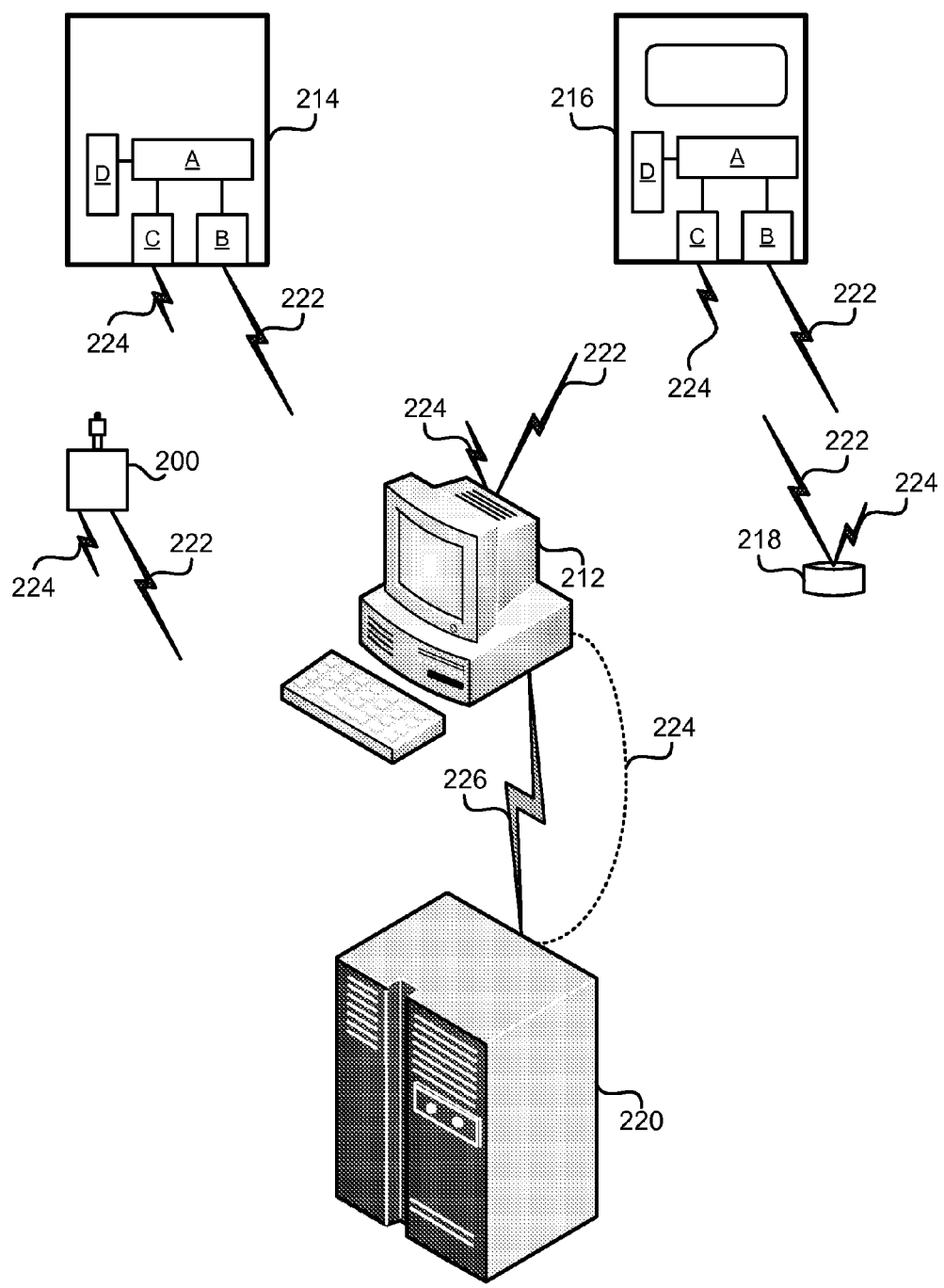
FIG. 18 is a system block diagram of a wireless patient monitoring system according to an embodiment.

The various embodiments enable a variety of applications beyond simply supporting encrypted communications. An example application is illustrated in FIG. 18 which shows a sensor, data collection and database system that may be employed within a hospital, such as in an intensive care unit. The various embodiments enable the creation of virtual cables (referred to herein as "V-cables") to link various medical devices to a network using flexible wireless communication links, thereby replacing cables presently used to communicate data from devices to monitors to data collection nodes. Such a system may include a patient monitoring computer 212 containing component described above with reference to FIG. 16 that is configured to communicate with a medium range wireless data link 222, such as a BlueTooth® protocol data link, as well as a close range communication link 224. Additionally, the patient monitoring computer 212 may be equipped with a long-range wireless transceiver able to communicate via a long-range wireless data link 226, such as a WiFi data link in order to connect to a hospital mainframe computer 220. Alternatively, the patient monitoring computer may be coupled to the hospital mainframe computer 220 by a wired network 224. Within the patient's intensive care unit may be certain patient monitoring equipment, such as an intravenous (IV) pump 214 and an electrocardiogram (ECG) monitor 216. Such patient monitoring equipment 214, 216, will typically include a processor A coupled to a memory D, a medium range wireless transceiver B, and a close range wireless transceiver C. So equipped, each medical device will be able to establish the close range communication link 224 employed in the various embodiments in order to receive credential information sufficient to establish secure communication via the medium range wireless network 222. The various embodiments may further be used to communicate patient data from sensors, such as a portable electrode 218 using both the medium range wireless network 222 and the close range communication link 224 employed in the various embodiments. In order to connect medical devices that are not equipped with close and medium range communication transceivers, a virtual cable connector 200 may be used to connect such devices to the patient monitor computer 212. More details regarding the virtual cable connector 200 are provided below with reference to FIG. 20.

Figure 19:
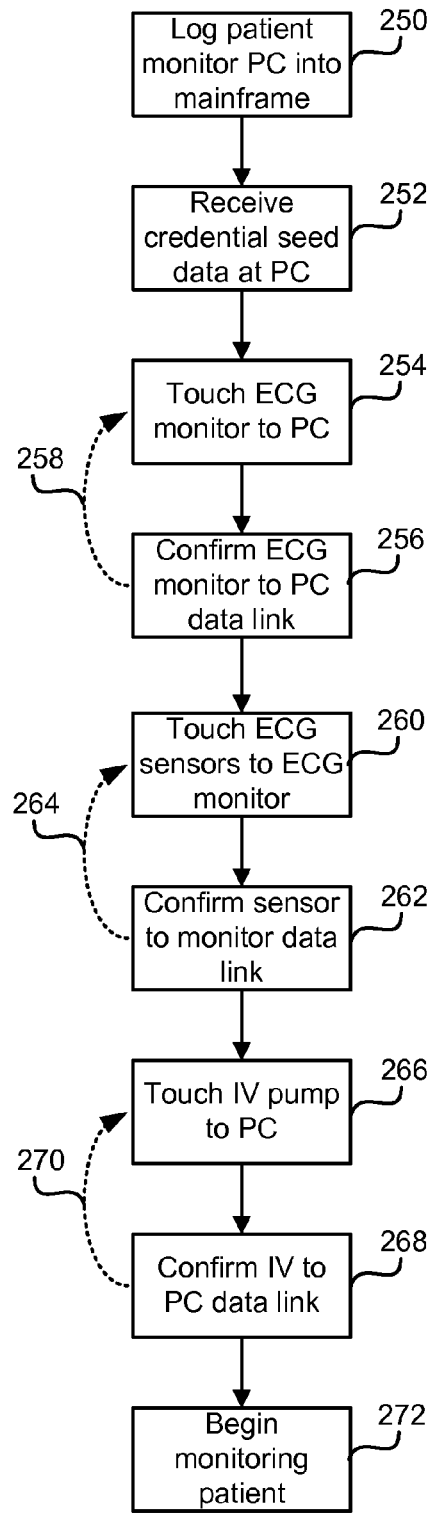
FIG. 19 is a process flow diagram of an embodiment method suitable for connecting components within the patient monitoring system shown in FIG. 18.

The operation of the system shown in FIG. 18 can be appreciated by considering an example of the steps required to begin monitoring a new patient. As illustrated in FIG. 19, the patient monitor computer 212 may be turned on and logged into the hospitals network and mainframe computer 220, step 250. Depending upon the implementation, the hospital mainframe computer 220 may send credential information to the patient monitor computer 212 along with any seed data used for encrypting wireless transmissions, step 252. To connect the ECG monitor 216 to the patient monitor computer 212, the monitor may be brought into close proximity to the computer to establish a close range communication link and receive credential information as described in the foregoing embodiments, step 254. Proper operation of the data link connecting the ECG monitor 216 to patient monitor computer 212 may be confirmed, step 256, and the process repeated if necessary, step 258. Then, each ECG sensor 218 may be configured to send data to the ECG monitor 216 simply by touching each sensor 218 to the monitor, step 260. Proper operation of the ECG sensor-to-monitor data link may be confirmed, step 262, with the process repeated if necessary, step 264. Similarly, the IV pump 214 can be coupled to the patient monitor computer 212 simply by bringing it into close proximity with the computer, step 266. Again, the pump-to-computer data link may be confirmed, step 268, and the process repeated if necessary, step 270. This process of touching to connect various medical devices may continue until all devices have been linked to the patient monitor computer 212. At that point, patient monitoring using the system illustrated in FIG. 18 may begin, step 272.

Figure 20:
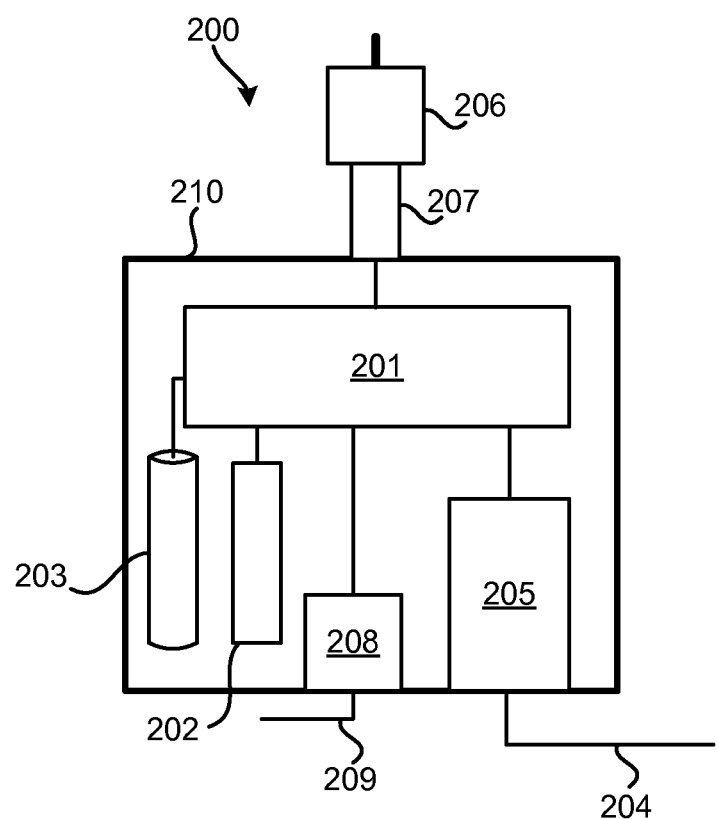
FIG. 20 is a circuit block diagram of an example virtual cable connector device suitable for use with the various embodiments

The method illustrated in FIG. 19 assumes that each medical device includes both close range wireless (e.g., NFC) and medium range wireless (e.g., BlueTooth®) transceivers. However, the system may also be implemented with medical devices that are configured for convention cable connections by using a V-cable connector 200, an example of which is illustrated in FIG. 20. A V-cable connector 200 may include a processor 201 coupled to memory 202 and a power supply, such as a battery 203. The V-cable connector 200 may include a medium-range transceiver 205 coupled to the processor 201 and an antenna 204 configured to establish medium-range wireless communications, such as using the BlueTooth® protocol. Additionally, the V-cable connector 200 may include a close range communication transceiver 208 connected to the processor 201 and an antenna 209. For example, the close range transceiver 208 may be an RFID device or an NFC protocol transceiver. Additionally, the V-cable connector 200 may include a connector plug 206 coupled to the connector via a coaxial cable 207. The connector plug 206 is configured to match the standard plug configuration of cables used to connect medical devices together and to a patient monitor computer 212. The V-cable connector 200 may be enclosed within a housing 210 to provide a unitary device that can simply be plugged into the cable port of medical devices just as if it were a cable. The processor 201 may be configured with software instructions, which may be stored in the memory 202, to cause the processor to operate the transceivers 205, 208 to perform steps according to the various embodiments. So configured, the V-cable connector 200 includes all of the communication elements needed to be able to connect one mobile device to another device having a V-cable connector 200 or internal transceivers using secure wireless communication networks as if the connection was made by a cable.

Figure 21:
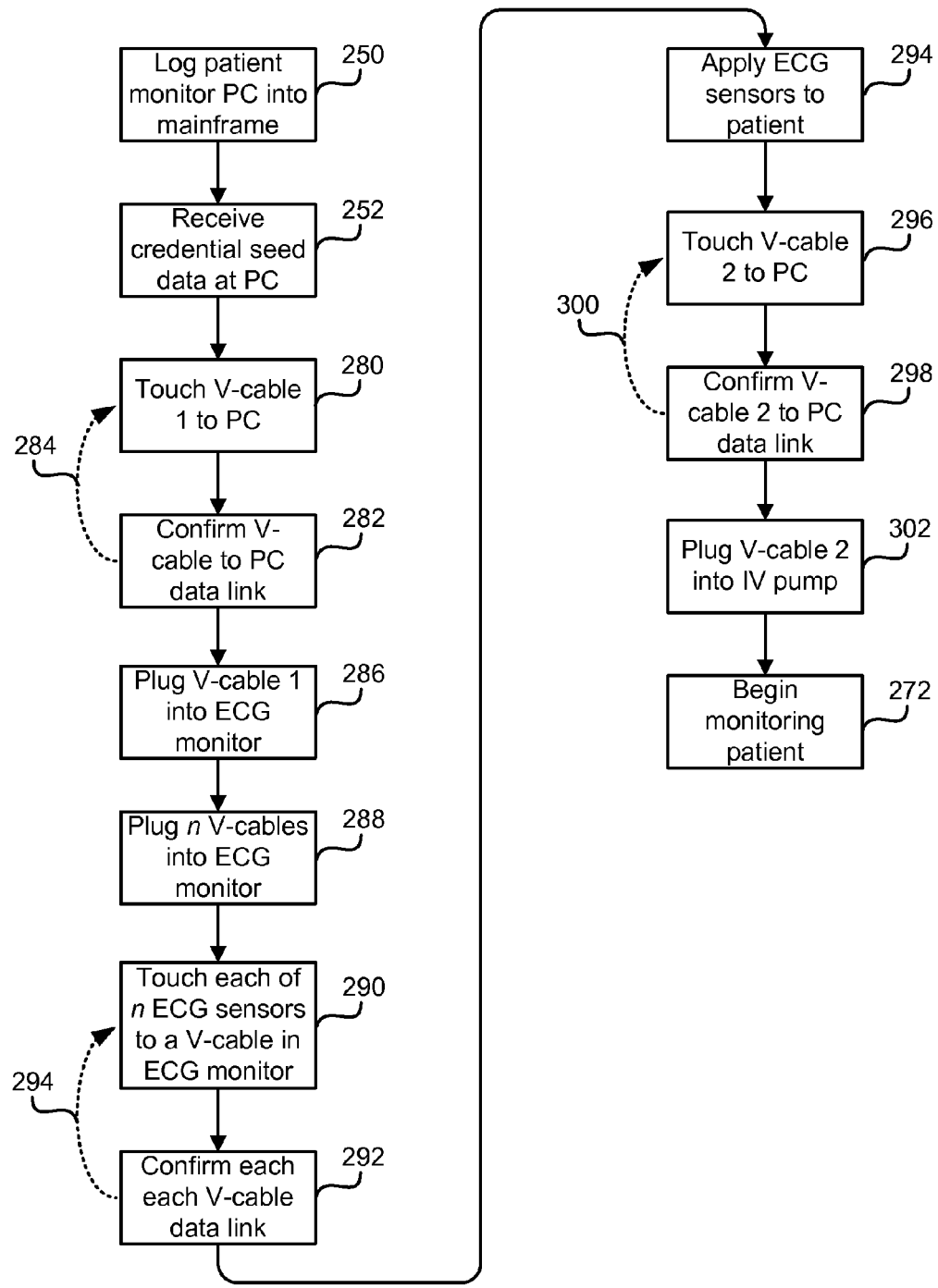
FIG. 21 is a process flow diagram of an embodiment method suitable for is a process flow diagram of an embodiment method suitable for connecting components within the patient monitoring system shown in FIG. 18 using the virtual cable connector device shown in FIG. 20.

The operation of the hospital system using V-cable connectors 200 can be appreciated by considering an example of steps required to assemble the system in order to monitor a new patient. As illustrated in FIG. 21, the patient monitor computer 212 may be turned on and logged into the hospitals network and mainframe computer 220, step 250. Depending upon the implementation, the hospital mainframe computer 220 may send credential information to the patient monitor computer 212 along with any seed data used for encrypting wireless transmissions, step 252. To connect various medical devices using V-cable connectors 200, one connector is touched to the patient monitor computer 212 to establish a close range communication link 222 in order to receive credential information, step 280. The connector-to-computer data link may be confirmed, step 282, and the process repeated if necessary, step 284. With the data link established, the V-cable connector 200 is plugged into a medical device, such as an ECG monitor 216, step 286. Then to connect a number of ECG sensors to the ECG monitor 216, an equal number of V-cable connectors 200 are plugged into the ECG monitor 216, step 288. If the ECG sensors 218 are equipped with wireless transceivers, as illustrated in FIG. 18, the sensors can be linked to the ECG monitor 216 by touching each sensor 218 to a respective one of the V-cable connectors 200 plugged into the ECG Monitor 216, step 290. The sensor-to-connector data link may be confirmed, step 292, and the process repeated if necessary, step 294. With the sensors electronically linked to the monitor, they then can be applied to the patient, step 294. The IV pump can be similarly connected to the patient monitor computer 212 by touching a V-cable connector 200 to the computer, step 296, verifying the connector-to-computer data link, step 298 (and repeating the process if necessary step 300) and then plugging the V-cable connector 200 into the IV pump, step 302. At this point, patient monitoring can begin, step 272.

As may be appreciated, the various embodiments can enable a variety of other applications for using virtual cables to quickly and simply replace physical cables. The use of encryption credentials with the medium-to-long range communication link will prevent interference by other V-cable connections as well as protect data from eavesdropping just as physical cables will do. Using the various embodiments, the process for establishing such ad hoc trust domains can be simplified to the intuitive process of simply touching components and virtual connectors together in order to establish the desired data link and security arrangement.

In the various devices, components and servers, the processor 171, 181, 191 and 201 may be any programmable microprocessor, microcomputer or multiple processor chip or chips that can be configured by software instructions (applications) to perform a variety of functions, including the functions of the various embodiments described above. In some devices, multiple processors 171, 181, 191, 201 may be provided, such as one processor dedicated to wireless communication functions and one processor dedicated to running other applications. Typically, software applications may be stored in the internal memory 172, 182, 192, 202 before they are accessed and loaded into the processor 171, 181, 191, 201. In some devices, the processor 171, 181, 191, 201 may include internal memory sufficient to store the application software instructions. For the purposes of this description, the term memory refers to all memory accessible by the processor 171, 181, 191, 201, including internal memory 172, 182, 192, 202 and memory within the processor 171, 181, 191, 201 itself. User data files are typically stored in the memory 172, 182, 192, 202. In many mobile devices, the memory 172, 182, 192, 202 may be a volatile or nonvolatile memory, such as flash memory, or a mixture of both.

In one or more exemplary embodiments, the functions described may be implemented in hardware, software, firmware, or any combination thereof. If implemented in software, the functions may be stored as one or more instructions or codes on a computer-readable medium, i.e., a non-transitory computer-readable medium. Computer-readable media includes computer storage media that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method for deploying credential infrastructure, comprising:
   establishing an initial communication link between a first device and a trust domain administrator;
   sending preloaded credential information from the first device to the trust domain administrator across the initial communication link;
   confirming the preloaded credential information;
   sending, from the trust domain administrator to the first device and a second device, an instruction for the first device and the second device to establish a close range communication link with each other;
   establishing the close range communication link between the first device and the second device in response to the instruction from the trust domain administrator;
   receiving a new credential information at the second device from the trust domain administrator;
   sending the new credential information across the close range communication link from the second device to the first device; and
   using the new credential information in communication between the first device and the second device transmitted via another communication link that is different from the close range communication link.

2. The method of claim 1, further comprising notifying a user of the receipt of the new credential information.

3. The method of claim 1, further comprising confirming an identity of a user using another separate credential.

4. The method of claim 3, wherein the separate credential is a password.

5. The method of claim 3, wherein the separate credential is biometric data.

6. The method of claim 1, wherein the close range communication link is a near-field communication (NFC) protocol communication link.

7. The method of claim 1, further comprising sending a request to register with a trust domain from the first device to the second device,
   wherein:
      the second device is already a member of the trust domain; and
      the new credential information is used to secure communication within the trust domain.

8. The method of claim 7, further comprising:
   forwarding the request to register with the trust domain from the second device to the trust domain administrator; and
   sending the new credential information from the trust domain administrator to the second device,
   wherein sending new credential information across the close range communication link comprises the second device forwarding the received new credential information to the first device across the close range communication link.

9. The method of claim 8, further comprising:
   prompting a user of the second device to provide a separate credential to the trust domain administrator;
   transmitting the separate credential to the trust domain administrator; and
   verifying the separate credential at the trust domain administrator,
   wherein sending the new credential information to the second device is accomplished in response to verifying the separate credential at the trust domain administrator.

10. The method of claim 1, further comprising:
    sending a credential information from the first device to the second device; and
    verifying the credential information,
    wherein sending new credential information across the close range communication link is accomplished in response to verifying the credential information.

11. The method of claim 1, further comprising:
    establishing the close range communication link between the first device and a third device; and
    sending the new credential information across the close range communication link from the first device to the third device.

12. A system, comprising:
    a network;
    a first communication device including a first transceiver and a second transceiver, wherein the first transceiver is configured to communicate via the network, and the second transceiver is a close range communication transceiver; and a second communication device including a third transceiver and a fourth transceiver, wherein the third transceiver is configured to communicate via the network, and the fourth transceiver is a close range communication transceiver, wherein the first communication device is configured to:
 establish an initial communication link across the network with a trust domain administrator via the first transceiver; and
 send preloaded credential information from the first communication device to the trust domain administrator across the initial communication link, wherein the first and second communication devices are configured to:
 receive an instruction from the trust domain administrator to establish a close range communication link between the first and second communication devices via the second and fourth transceivers;
 establish the close range communication link between the first and second communication devices via the second and fourth transceivers in response to the instruction from the trust domain administrator;
 receive a new credential information at the second communication device from the trust domain administrator;
 exchange the new credential information between the first and second communication devices via the close range communication link; and
 establish communications between the first and second communication devices via the first and third transceivers based on the exchanged new credential information.

13. A medical monitoring system, comprising:
 a computer, including:
  a computer processor;
  a memory coupled to the processor;
  a first transceiver coupled to the processor; and
  a second transceiver coupled to the processor, the second transceiver being a close range communication transceiver; and
 a medical device, including:
  a medical device processor;
  a third transceiver coupled to the medical device processor; and
  a fourth transceiver coupled to the medical device processor, the fourth transceiver being a close range communication transceiver,
  wherein the medical device processor is configured with software instructions to perform operations comprising:
   establishing an initial communication link with a hospital server via the third receiver;
   sending preloaded credential information to the hospital server across the initial communication link;
   receiving a first instruction from the hospital server to establish a close range communication link with the computer;
   establishing the close range communication link between the medical device and the computer via the fourth transceiver in response to the received first instruction;
   receiving a new credential information from the computer over the close range communication link; and
   using the new credential information in communications between the medical device and the computer using the third transceiver,
  wherein the computer processor is configured with software instructions to perform operations comprising:
   receiving a second instruction from the hospital server to establish the close range communication link with the medical device;
   establishing the close range communication link between the computer and the medical device via the second transceiver in response to the received second instruction;
   receiving the new credential information from the hospital server;
   providing the new credential information to the medical device over the close range communication link, and
   using the new credential information in communications between the computer and the medical device using the first transceiver.

14. The medical monitoring system of claim 13, wherein the hospital server comprises:
 a server processor; and
 a network connection circuit coupled to a network and configured to send signals to and receive data from the computer,
 wherein the server processor is configured with software instructions to perform operations comprising:
  receiving preloaded credential information from the medical device via the initial communication link;
  confirming the preloaded credential information from the medical device;
  sending the first and second instructions to the computer and the medical device to establish the close range communication link with each other in response to confirming the preloaded credential information;
  providing the new credential information to the computer via the network; and
  using the new credential information in communications between the hospital server and the computer via the network.

* * * * *